(12) United States Patent
Butter

(10) Patent No.: US 9,606,604 B1
(45) Date of Patent: Mar. 28, 2017

(54) ENERGY EFFICIENT HIGH-SPEED LINK AND METHOD TO MAXIMIZE ENERGY SAVINGS ON THE ENERGY EFFICIENT HIGH-SPEED LINK

(71) Applicant: GLOBALFOUNDRIES INC., Grand Cayman (KY)

(72) Inventor: Adrian S. Butter, Pittsburgh, PA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/951,544

(22) Filed: Nov. 25, 2015

(51) Int. Cl.
  *G06F 1/32* (2006.01)
  *G06F 1/00* (2006.01)
  *H04B 7/00* (2006.01)

(52) U.S. Cl.
  CPC .................................. *G06F 1/3206* (2013.01)

(58) Field of Classification Search
  CPC ........................................................ G06F 1/3203
  USPC ........................................................... 713/320
  See application file for complete search history.

(56) References Cited

U.S. PATENT DOCUMENTS

| | | | | |
|---|---|---|---|---|
| 5,606,742 A * | 2/1997 | Kido | ................... | H04W 88/026 340/7.38 |
| 6,192,027 B1 | 2/2001 | El-Butal | | |
| 6,993,667 B1 | 1/2006 | Lo | | |
| 7,853,284 B2 * | 12/2010 | Iwanaga | ............. | H04W 52/241 370/318 |
| 8,255,779 B2 * | 8/2012 | Booth | ................. | H03M 13/333 714/756 |
| 8,259,716 B2 * | 9/2012 | Diab | ....................... | H04L 12/12 370/389 |
| 8,270,396 B2 | 9/2012 | Berman | | |
| 8,276,013 B2 * | 9/2012 | Diab | ....................... | H04L 12/12 713/323 |
| 8,656,195 B2 | 2/2014 | Dove | | |
| 8,769,082 B2 * | 7/2014 | Powell | .................. | G06F 1/3209 370/463 |

(Continued)

FOREIGN PATENT DOCUMENTS

EP  2224311  9/2010

OTHER PUBLICATIONS

Rakesh Kumar Pradhan et al., "Access Network Energy Efficient Dynamic Power Scaling", IEEE, 2012, pp. 1-5.

*Primary Examiner* — Suresh Suryawanshi
(74) *Attorney, Agent, or Firm* — Gibb & Riley, LLC; David A. Cain, Esq.

(57) ABSTRACT

In high-speed link structures a receiver outputs a signal detect indicator (SDI) with a first logic value when transmissions are detected and a second logic value when suspension of transmissions is detected. A controller detects transitions in the SDI and causes corresponding transitions in an energy detect indicator (EDI). A physical control sublayer (PCS) has different operating states that cause the receiver to operate in different power modes and transitions between the operating states based on the EDI. If the EDI has the second logic value, the PCS remains in a non-active state and the receiver operates in a low power idle (LPI) mode. When the EDI transitions to the first logic value, the PCS exits the non-active state and the receiver operates in a non-LPI mode. To ensure that the PCS properly enters and doesn't pre-maturely exit the non-active state, EDI transitions to the first logic value are delayed.

20 Claims, 9 Drawing Sheets

(56) References Cited

U.S. PATENT DOCUMENTS

| | | |
|---|---|---|
| 2004/0153685 A1 | 8/2004 | Tuttle et al. |
| 2005/0194996 A1 | 9/2005 | Moran et al. |
| 2009/0059948 A1 | 3/2009 | Stueve |
| 2009/0204836 A1 | 8/2009 | Diab et al. |
| 2010/0322078 A1 | 12/2010 | Wang et al. |
| 2011/0026416 A1 | 2/2011 | Tazebay et al. |
| 2012/0188885 A1 | 7/2012 | Tazebay et al. |
| 2014/0126908 A1 | 5/2014 | Diab |
| 2014/0161141 A1 | 6/2014 | Lusted et al. |
| 2015/0019887 A1 | 1/2015 | Yu |
| 2015/0023660 A1 | 1/2015 | Kramer et al. |
| 2015/0078404 A1* | 3/2015 | Diab ............... H04L 12/12 370/503 |
| 2015/0131681 A1* | 5/2015 | Balbierer ......... H04L 67/12 370/477 |

\* cited by examiner

ENERGY EFFICIENT HIGH-SPEED LINK AND METHOD TO MAXIMIZE ENERGY SAVINGS ON THE ENERGY EFFICIENT HIGH-SPEED LINK

FIELD OF THE INVENTION

The present invention relates to energy efficient high-speed links in computer network technologies and, more particularly, an energy efficient high-speed link and a method to maximize energy savings in the high-speed link.

BACKGROUND

Energy-efficient high-speed links allow for high-speed transmission of data between computer devices (e.g., between integrated circuits) during active operating periods while conserving energy during inactive operating periods in computer network technologies (e.g., Energy Efficient Ethernet (EEE), according to the Institute of Electrical and Electronics Engineers (IEEE) 802.3az-2010 standard, and Energy Efficient Fibre Channel (FC-EE), according to the emerging Fibre Channel-Framing and Signaling (FC-FS)-4 standard). Both of these standards allow a high-speed link (hereinafter referred to as the link) to operate in a low power idle (LPI) mode (also referred to herein as a low power operating mode or a reduced power operating mode) and, specifically, allow the circuitry on opposite sides of the link (i.e., on the transmitter-side and the receiver-side) to operate at a lower or reduced power in order to save energy when no data frames are being transferred across the link from the transmitter to the receiver. In order to enable this LPI mode, both of these standards include transmitter and receiver state diagrams that indicate when the transmitter and receiver-sides of the link should be in the LPI mode and when they should not be in the LPI mode. While such state diagrams indicate when the transmitter and receiver-sides of the link should or should not be in the LPI mode, neither standard adequately provides for the required signal timing and stability control needed to ensure maximum energy savings without performance degradation.

SUMMARY

Disclosed herein are embodiments of an energy-efficient high-speed link and, particularly, embodiments of a receiver-side structure of such a high-speed link. The receiver-side structure of the high-speed link can incorporate a receiver and a signal controller electrically connected to the receiver. The receiver can be connected to a transmitter and, particularly, can be in communication with a transmitter over a channel such that the receiver receives data signals that are intermittently sent by the transmitter over the channel. The receiver can have a signal detector that can detect data signal transmissions on the channel and that can also detect suspension of those data signal transmissions. Additionally, the signal detector can output a signal detect indicator (SDI), the logic value of which varies depending upon whether data signal transmissions have been detected or whether the suspension of data signal transmissions has been detected. For example, the signal detector can cause the SDI to have a first logic value (e.g., a logic value of "1") during data signal transmissions and to have a second logic value (e.g., a logic value of "0") during suspension of data signal transmissions. The signal controller can receive the SDI from the signal detector and can output an energy detect indicator (EDI), the logic value of which varies depending upon the logic value of the SDI. Specifically, the signal controller can detect transitions in the SDI and can cause corresponding transitions in the EDI. For example, the signal controller can detect a transition in the SDI from the first logic value (e.g., the logic value of "1") to the second logic value (e.g., the logic value of "0") and can cause the EDI to similarly transition from the first logic value to the second logic value and vice versa.

As discussed further in the detailed description section of this specification, this EDI can, for example, be an input to a physical control sublayer (PCS). Based, at least in part, upon the logic value of the EDI, the PCS can transition between multiple different operating states, including at least one non-active state and an active state, and the amount of power supplied to the receiver can vary based upon the operating state of the PCS. For example, when EDI has the second logic value (e.g., the logic value of "0") indicating that data signal transmissions from the transmitter to the receiver have been suspended, the PCS can remain in a non-active operating state (e.g., a "QUIET" state) and, as a result, the amount of power supplied to the receiver can be relatively low (i.e., the receiver can operate in a low power idle (LPI) mode) for energy savings. When the EDI transitions from the second logic value to the first logic value (e.g., from a logic value of "0" to a logic value of "1") indicating that data signal transmissions from the transmitter to the receiver have resumed, the PCS can exit the above-mentioned non-active state (e.g., the "QUIET" state) and, as a result, the amount of power supplied to the receiver can be increased (i.e., the receiver can operate in a non-LPI mode). In order to ensure that the PCS properly remains in the non-active state (e.g., the "QUIET" state) such that the receiver remains in the LPI mode (e.g., even in the event that the SDI transitions from the second logic value to the first logic value early) and to also ensure that the PCS does not prematurely exit the non-active state (e.g., even in the event that the SDI is initially metastable), once the EDI transitions from the first logic value (e.g., the logic value of "1") to the second logic value (e.g., the logic value of "0"), the signal controller can, according to predefined rules, delay any subsequent transition of the EDI back to the first logic value. For example, the delay can be until a predetermined time period has elapsed. Alternatively, the delay can be until either a predetermined time period has elapsed or a stable signal detect indicator first logic value has been detected (i.e., until the signal controller has evaluated the stability of the first logic value on the SDI and determined that the first logic value of the SDI is stable), whichever comes first.

Also disclosed herein are methods of operating a high-speed link and, particularly, a receiver-side structure of a high-speed link, as discussed above. The method can include the following steps performed by a receiver of the receiver-side structure: receiving data signals transmitted from a transmitter over a channel that connects the transmitter, wherein transmission of the data signals by the transmitter can be intermittent; detecting either data signal transmissions on the channel or the suspension of such data signal transmissions; and outputting a signal detect indicator (SDI), the logic value of which varies depending upon whether data signal transmissions have been detected or whether the suspension of data signal transmissions has been detected. For example, the SDI can have a first logic value (e.g., a logic value of "1") during data signal transmissions and a second logic value (e.g., a logic value of "0") during suspension of data signal transmissions. The method can further include the following steps performed by a signal controller operably connected to the receiver: receiving the SDI and outputting an energy detect indicator (EDI), the logic value of which varies depending upon the logic value of the SDI. Specifically, the method steps can also include detecting, by the signal controller, of transitions in the signal detect indicator and causing, by the signal controller, corresponding transitions in the energy detect indicator. For example, when a transition in the SDI from the first logic value (e.g., the logic value of "1") to the second logic value (e.g., the logic value of "0") is detected, the EDI can also be forced to transition from the first logic value to the second logic value and vice versa.

As discussed further in the detailed description section of this specification, this EDI can, for example, be an input to a physical control sublayer (PCS). Based, at least in part, upon the logic value of the EDI, the PCS can transition between multiple different operating states and the amount of power supplied to the receiver can vary based upon the operating state of the PCS. For example, when EDI has the second logic value (e.g., the logic value of "0") indicating that data signal transmissions from the transmitter to the receiver have been suspended, the PCS can remain in a non-active operating state (e.g., a "QUIET" state) and, as a result, the amount of power supplied to the receiver can be relatively low (i.e., the receiver can operate in a low power idle (LPI) mode) for energy savings. When the EDI transitions from the second logic value to the first logic value (e.g., from a logic value of "0" to a logic value of "1") indicating that data signal transmissions from the transmitter to the receiver have resumed, the PCS can exit the above-mentioned non-active state (e.g., the "QUIET" state) and, as a result, the amount of power supplied to the receiver can be increased (i.e., the receiver can operate in a non-LPI mode). In order to ensure that the PCS properly remains in the non-active state (e.g., the "QUIET" state) such that the receiver remains in the LPI mode (e.g., even in the event that the SDI transitions from the second logic value to the first logic value early) and to also ensure that the PCS does not prematurely exit the non-active state (e.g., even in the event that the SDI is initially metastable), the method steps can further include delaying, by the signal controller according to predefined rules, any transition of the EDI from the second logic value back to the first logic value. For example, the delay can be until a predetermined time period has elapsed. Alternatively, the delay can be until a predetermined time period has elapsed or until a stable signal detect indicator first logic value is detected (i.e., until an evaluation of the stability of the first logic value on the SDI has been performed and determination has been made that the first logic value of the SDI is stable), whichever comes first.

BRIEF DESCRIPTION OF THE SEVERAL VIEWS OF THE DRAWINGS

The present invention will be better understood from the following detailed description with reference to the drawings, which are not necessarily drawn to scale and in which.

DETAILED DESCRIPTION

As mentioned above, energy-efficient high-speed links allow for high-speed transmission of data between computer devices (e.g., between integrated circuits) during active operating periods while conserving energy during inactive operating periods in computer network technologies (e.g., Energy Efficient Ethernet (EEE), according to the Institute of Electrical and Electronics Engineers (IEEE) 802.3az-2010 standard, and Energy Efficient Fibre Channel (FC-EE), according to the emerging Fibre Channel-Framing and Signaling (FC-FS)-4 standard). Both of these standards allow a high-speed serial link (hereinafter referred to as the link) to operate in a low power idle (LPI) mode (also referred to herein as a low power operating mode or a reduced power operating mode) and, specifically, allow the circuitry on opposite sides of the link (i.e., on the transmitter-side and on the receiver-side) to operate at a lower or reduced power in order to save energy when no data frames are being transferred across the link from the transmitter to the receiver. In order to enable this LPI mode, both of these standards include transmitter and receiver state diagrams that indicate when the transmitter and receiver-sides of the link should be in the LPI mode and when they should not be in the LPI mode. While such state diagrams indicate when the transmitter and receiver-sides of the link should or should not be in the LPI mode, neither standard adequately provides for the required signal timing and stability control needed to ensure maximum energy savings without performance degradation.

Figure 1:
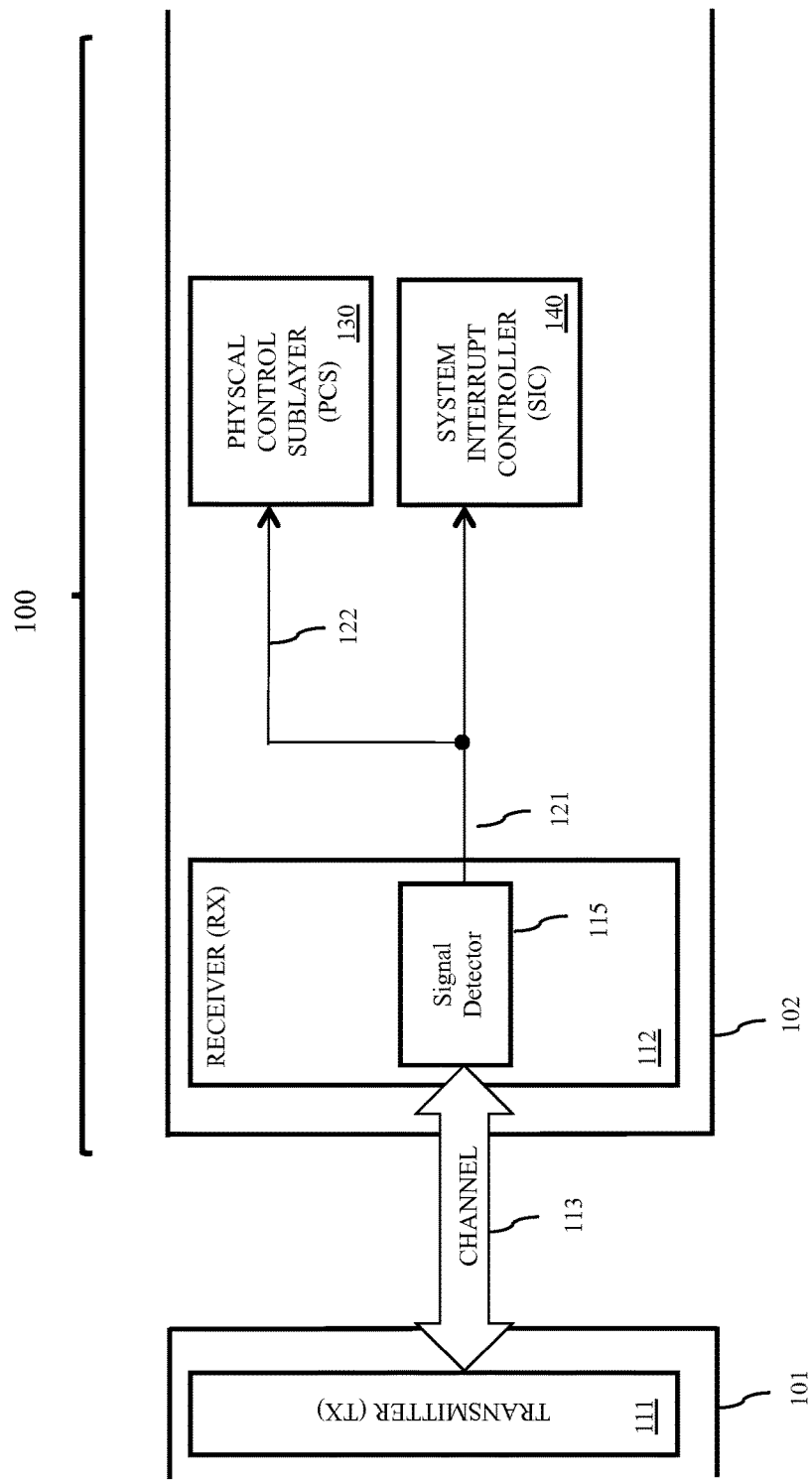
FIG. 1 is a schematic diagram illustrating an exemplary high-speed link.

For example, referring to FIG. 1, a conventional high-speed serial (HSS) link can have a transmitter-side structure that incorporates a transmitter (TX) 111 on a first computer device 101 (e.g., a first application specific integrated circuit (ASIC) chip), a receiver-side structure 100 that incorporates a receiver (RX) 112 on a second computer device 102 (e.g., a second ASIC chip), and a channel 113 connecting the transmitter 111 to the receiver 112. According to both of the above-mentioned standards, the specific state during which the LPI mode may occur on the receiver-side of the link is a non-active state typically referred to as a "QUIET" state (e.g., "RX_QUIET" in IEEE 802.3az-2010 and "R3: QUIET" in FC-FS-4). Entry of the receiver 112 into the "QUIET" state is triggered by a detected loss of synchronization (as indicated by "frx_block_lock" in IEEE 802.3az-2010 and "!rx_sync" in FC-FS-4), which is due to the suspension of signaling by the transmitter 111 to the receiver 112 over the channel 113. Additionally, exit of the receiver 112 from the "QUIET" state and entry into an active state is triggered by detection of energy on the channel 113 (as indicated by "energy_detect" in both standards), which is due to the resumption of signaling to the receiver 112 by the transmitter 111. Specifically, the receiver-side structure 100 of the link can have the receiver 112 as well as various other components including, but not limited to, a physical control sublayer (PCS) 130 (e.g., in the form of a finite state machine) whose operating state may be used by the ASIC chip to control power on the receiver-side of the link and a system interrupt controller (SIC) 140. The receiver 112 can incorporate a signal detector 115, which outputs a signal detect indicator (SDI) 121 to the SIC 140 and also, as an energy detect indicator 122, to the PCS 130. Loss of synchronization is detected by the PCS 130 whenever, during a given synchronization header sampling window, it is determined that the number of bad synchronization headers detected is above a threshold number. This loss of synchronization is a direct consequence of the transmitter 111 having suspended signaling during LPI mode and, when this loss of synchronization is detected, the PCS 130 enters the "QUIET" state. Additionally, according to both standards, after the PCS 130 has entered the "QUIET" state, the SDI 121 (i.e., "SIGNAL_DETECT" in IEEE 802.3az-2010 and "Rx_LOS" [Receiver Loss of Signal]=!"SIGNAL_DETECT" in FC-FS-4) is switched to low (i.e., to a logic "0") by the receiver 112. However, neither standard specifies the duration of the time period within which the SDI 121 output by the signal detector 115 of the receiver 112 should be switched to low following entry of the PCS 130 into the LPI mode "QUIET" state. Therefore, the SDI 121 may remain high (i.e., at logic "1") for some undefined duration after the PCS 130 has entered the "QUIET" state and this undefined duration is highly dependent on the electrical characteristics of the receiver 112, of the transmitter 111 on the opposite side of the link and of the channel 113 connecting the transmitter 111 and the receiver 112. As mentioned above, the EDI 122, which indicates detection of energy on the channel 113 and which triggers exit from the LPI mode, is a logical function of the SDI 121. That is, when SDI 121 is high (i.e., at logic "1"), the EDI 122 is high (i.e., logic "1") and vice versa. Consequently, if, as discussed above, the SDI 121 remains high for some undefined period of time after the PCS has entered the "QUIET" state, the EDI 122 also remains high, causing the PCS to prematurely exit the "QUIET" state. Consequently, the receiver-side of the link may realize less energy savings than expected.

Another problem noted with transitions into and out of the receiver-side "QUIET" state is that it is assumed that, when the SDI 121 has switched to low it will be "well-behaved" (i.e., it won't bounce back and forth between high and low). That is, it is assumed that the SDI 121 will make the transition from high to low following entry into the "QUIET" state and will remain stable (i.e., will not bounce back and forth between high and low during the transition into the "QUIET" state). However, when implemented as part of an actual receiver circuit design and attached to a real communications channel, the SDI 121 and, thereby the EDI 122 may not be "well-behaved" (i.e., may be metastable), making multiple transitions before finally settling at the low logic value. The nature and duration of the metastability of the signal detect indicator 121 is highly dependent on the application environment and, as a result, the PCS 130 "QUIET" state can be exited prematurely. Consequently, the receiver-side of the link may realize less energy savings than expected. It should be noted that similar metastability can occur when the SDI 121 is switched to high.

Yet another problem noted with transitions into and out of the receiver-side PCS 130 "QUIET" state is that, since a compliant transmitter has no defined minimum time it must spend in its "QUIET" state (i.e. per 802.3az-2010 FIG. 49.16 [LPI Transmit state diagram]), it can exit its "QUIET" state whenever a data frame other than Low Power Idle [LPI] is detected and the interface can start waking up (e.g., by transmitting the ALERT pattern) even before the receiver-side SDI 121 and, thereby the EDI 122, has transitioned to a stable low logic value such that the PCS 130 remains in its "QUIET" state. When this occurs, the SDI 121 on the receiver-side may remain high (i.e., may not transition to low) on or shortly after entry to the PCS 130 "QUIET" state. In this scenario, it is important that the receiver-side PCS 130 be able to exit from the "QUIET" state as expeditiously as possible after the transmitter 111 resumes signaling to ensure that the receiver 112 and transmitter 111 stay tightly synchronized with each other so that the receiver 112 has as much time as possible to adjust its electrical parameters based on the signaling of the transmitter 111 during the "Wake" time period preceding data transmission, thereby minimizing the chance of errors when data transmission resumes. The ability to exit the receiver-side PCS 130 "QUIET" state as quickly as possible to ensure the receiver 112 and transmitter 111 stay tightly synchronized with each other also extends to scenarios in which the transmitter 111 periodically wakes up the receiver 112 during "Refresh" time periods between successive "Quite" states. Expeditiously acting on the receiver-side SDI 121 and, thereby the EDI 122, to exit the PCS 130 "QUIET" state is contrary to the delayed reaction to changes in the receiver-side SDI 121 needed to resolve that signal's aforementioned unpredictable transition times.

In view of the foregoing, disclosed herein are energy-efficient high-speed link structures. Each structure can have a receiver that intermittently receives data signals. The receiver can have a signal detector that that outputs a signal detect indicator (SDI) with a first logic value when data signal transmissions are detected and with a second logic value when suspension of the data signal transmissions is detected. A signal controller can detect transitions in the SDI and can cause corresponding transitions in an energy detect indicator (EDI). A physical control sublayer (PCS) can have different operating states, which cause the receiver to be supplied different amounts of power (i.e., to operate in different power modes) and can transition between the different operating states based, at least in part, on the logic value of the EDI. For example, when the EDI has the second logic value, the PCS can remain in a non-active operating state (e.g., a "QUIET" state) and, as a result, the amount of power supplied to the receiver can be relatively low (i.e., the receiver can operate in a low power idle (LPI) mode) for energy savings. When the EDI transitions from the second logic value to the first logic value, the PCS can exit the above-mentioned non-active state (e.g., the "QUIET" state) and, as a result, the amount of power supplied to the receiver can be increased (i.e., the receiver can operate in a non-LPI mode). In order to ensure that the PCS properly remains in the non-active state (e.g., the "QUIET" state) such that the receiver remains in the LPI mode (e.g., even in the event that the SDI transitions from the second logic value to the first logic value early) and to also ensure that the PCS does not prematurely exit the non-active state (e.g., even in the event that the SDI is initially metastable), once the EDI transitions from the first logic value to the second logic value, any subsequent transition of the EDI back to the first logic value can be delayed. Also disclosed are corresponding methods of operating a high-speed link to maximize energy savings.

Figure 2:
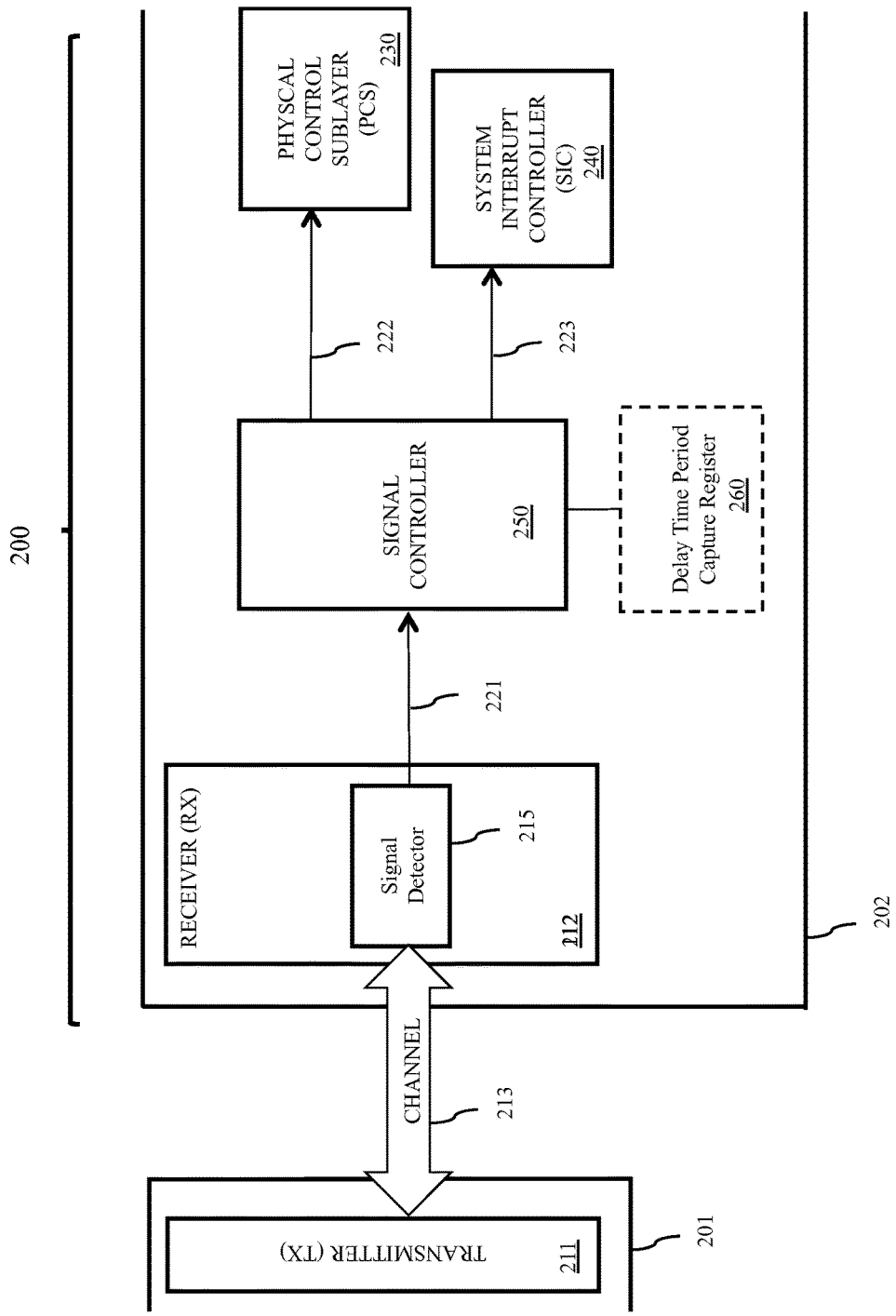
FIG. 2 is a schematic diagram illustrating a high-speed link with a receiver-side structure that controls entry into and exit from a low power idle (LPI) mode for maximum energy savings.

More particularly, referring to FIG. 2, disclosed herein are embodiments of an energy-efficient high-speed link (e.g., a high-speed serial (HSS) link) that allows for high-speed transmission of data between computer devices in computer network technologies (e.g., Energy Efficient Ethernet (EEE) or Energy Efficient Fibre Channel (FC-EE) technologies) and, particularly, embodiments of the receiver-side structure 200 of such a high-speed link. Specifically, a high-speed link can have a transmitter-side structure that incorporates a transmitter (TX) 211 on a first computer device 201 (e.g., a first application specific integrated circuit (ASIC) chip or any other suitable first computer device), a receiver-side structure 200 that incorporates a receiver (RX) 212 on a second computer device 202 (e.g., a second ASIC chip or any other suitable second computer device), and a channel 213 connecting the transmitter 211 to the receiver 212.

The receiver-side structure 200 of the link can further incorporate, on the second computer device 202, a signal controller 250 electrically connected to the receiver 212. Additional components of the receiver-side structure 200 can include, but are not limited to, the following components that are operably connected to the signal controller 250: a physical control sublayer (PCS) 230, a system interrupt controller (SIC) 240, and, optionally, a delay time period capture register 260.

Specifically, the receiver 212 can receive data signals that are intermittently transmitted over the channel 213 from the transmitter 211. The receiver 212 can also have a signal detector 215 that can detect (i.e., that is adapted to detect, that is configured to detect, etc.) resumption of data signal transmissions on the channel 213 and that can also detect suspension of those data signal transmissions.

The signal detector 215 can output (i.e., can be adapted to output, can be configured to output, etc.) a signal detect indicator (SDI) 221 (also referred to herein as SYNC_SIG-DET), the logic value of which varies depending upon whether resumption of data signal transmissions has been detected or whether suspension of data signal transmissions has been detected. For example the signal detector 215 can cause the SDI 221 to be a first logic value (e.g., a logic value of "1") during data signal transmissions and to be a second logic value (e.g., a logic value of "0") during suspension of data signal transmissions. Such a signal detector 215 can, for example, detect data signal transmissions or suspension of data signal transmissions based on synchronization or loss of synchronization, respectively, as discussed in detail above with regard to the signal detector 115.

The signal controller 250 can receive the SDI 221 from the signal detector 215 and can output (i.e., can be adapted to output, can be configured to output, etc.) an energy detect indicator (EDI) 222 (also referred to herein as ENER-GY_DETECT), the logic value of which is dependent upon the logic value of the SDI 221. Specifically, the signal controller 250 can detect (i.e., can be adapted to detect, can be configured to detect, etc.) transitions in the SDI 221 and can cause (i.e., can be adapted to cause, can be configured to cause, etc.) corresponding transitions in the EDI 222. For example, the signal controller 250 can detect a transition in the SDI 221 from the first logic value (e.g., the logic value of "1") to the second logic value (e.g., the logic value of "0") and can cause the EDI 222 to similarly transition from the first logic value to the second logic value and vice versa.

The PCS 230 can, for example, be in the form of a finite state machine (FSM) having different operating states which cause a power supply system of the second computer device 202 to supply the receiver 212 with different amounts of power (i.e., which cause the receiver to operate in different power modes). The PCS 230 can transition between the different operating states based, at least in part, on the logic value of the EDI 222. Specifically, the PCS 230 can have one or more non-active states (including, but not limited to, a "QUIET" state) that cause a power supply system of the second computer device 202 to supply a relatively low amount of power to the receiver 212 (i.e., to cause the receiver 212 to operate in a low power idle (LPI) mode). The PCS 230 can further have an active state that causes the power supply system to increase the amount of power supplied to the receiver to an amount sufficient for normal operation (i.e., to cause the receiver 212 to operate in a non-LPI mode). The EDI 222 can be an input to the PCS 230 and, depending upon the logic value of the EDI 222, can cause the operating state of the PCS 230 to remain in or exit a non-active state (e.g., the "QUIET" state). For example, when the EDI 222 has the second logic value (e.g., the logic value of "0") indicating that the receiver 212 is not receiving data signal transmissions (i.e., indicating that the receiver 212 is in a quiescent state), the PCS 230 operating state can remain in the non-active state (e.g., the "QUIET" state), thereby causing the receiver 212 to remain in the LPI-mode for maximum energy savings. However, when the EDI 222 has the first logic value (e.g., the logic value of "1") indicating that the receiver 212 is receiving data signal transmissions, the PCS 230 operating state can exit the non-active state (e.g., the "QUIET" state), pass through other non-active states (if applicable) and eventually enter an active state, thereby causing the receiver 212 to operate in the non-LPI mode. Thus, the different PCS 230 operating states allow for energy savings when data signal transmissions from the transmitter 211 to the receiver 212 have been suspended and the receiver 212 is no longer active (i.e., is in a quiescent state) and, thereby no longer in need of full power to operate.

In order to ensure that the PCS 230 remains in the non-active state and, particularly, the "QUIET" state such that the receiver 212 remains in the LPI mode upon detection of suspension of data signal transmissions from the transmitter 211 (e.g., upon detection of loss of synchronization with the transmitter 211) (e.g., even in the event that the signal detect indicator 221 transitions from the second logic value to the first logic value early) and also to ensure that the PCS 230 does not prematurely exit that non-active state (e.g., even in the event that the SDI 221 is initially metastable), once the EDI 222 transitions from the first logic value to the second logic value (e.g., from the logic value of "1" to the logic value of "0"), the signal controller 250 can, according to predefined rules, delay any subsequent transition of the EDI 222 back to the first logic value. For example, the delay can be until a predetermined time period (also referred to herein as a debounce time window) has elapsed since detection of the SDI 221 transition to the first logic value. Alternatively, the delay can be until either the predetermined time period has elapsed or until a stable signal detect indicator first logic value is detected (i.e., until logic in the signal controller 250, referred to herein as "one detect logic" has evaluated the stability of the first logic value on the SDI 221 and determined that the first logic value of the SDI 221 is stable), whichever comes first. It should be noted that the predetermined time period (i.e., the debounce time window) used to delay transition of the EDI 222 to the first logic value can be adjustable in order to optimize power savings and performance (i.e., to maximize power savings, while avoiding or minimizing any performance degradation). Specifically, the predetermined time period can, for example, be set manually by a user so as to optimize power savings and performance. Alternatively, the predetermined time period can be set automatically and dynamically. For example, optionally, the receiver-side structure 200 of the link can also incorporate a delay time period capture register 260 (also referred to herein as a debounce time window capture register) that is operably connected to the signal controller 250. This register 260 can be included in the receiver-side structure 200 as a bring-up and/or debug aid that allows the transition behavior of the SDI 221 to be observed in order to characterize the amount of time within which the SDI 221 goes from being metastable (i.e., bouncing between logic values) to stable following a transition, given the electrical characteristics of the link. The signal controller 250 can then use (i.e., can be adapted to use, can be configured to use, etc.) the time period captured by the register 260 as the basis for calculating a predetermined time period used to delay transition of the EDI 222.

In addition to outputting the EDI 222, as described above, the signal controller 250 can generate and output (i.e., can be adapted to generate and output, can be configured to generate and output, etc.) a signal detect interrupt control signal (ICS) 223 (also referred to herein as NON_LPI_SIGDET) to the SIC 240. The SIC 240 can receive the ICS 223 and can control (i.e., can be adapted to control, can be configured to control, etc.) interrupt processing based on the logic value of the ICS 223. For example, when the logic value of the ICS 223 is the first logic value (e.g., the logic value of "1"), the SIC 240 will not perform interrupt processing for a "loss of signal" error; whereas, when the logic value of the ICS 223 transitions from the first logic value to the second logic value, the SIC 240 will perform interrupt processing in order to account for any "loss of signal" errors. Specifically, the signal controller 250 can generate an ICS 223 such that, when the SDI 221 and EDI 222 have the second logic value, the PCS 230 is in the non-active state (e.g., the "QUIET" state) and the receiver 212 is in the LPI mode, the logic value of the ICS 223 is held at the first logic value (e.g., a logic value of "1"). This is because, when the PCS 230 is in the non-active state (e.g., the "QUIET" state) and the receiver 212 is operating in the LPI mode, transitions in the signal detect indicator 221 may occur (e.g., due to metastability following transition to the the second logic value), but they are not indicative of a "loss of signal" error requiring interrupt processing. The signal controller 250 can further generate the ICS 223 such that, only when the PCS 230 has exited the non-active state (e.g., the "QUIET" state) and entered the active state and the receiver 212 has entered the non-LPI mode (i.e., when the SDI 221 and EDI 222 have transitioned back to the first logic value), is the logic value of ICS 223 permitted to transition to the second logic value (e.g., a logic value of "0") in response to a transition detected in the SDI 221. The purpose of the ICS 223 during the active state of the PCS 230 and non-LPI mode of the receiver 212 (i.e., when the receiver 212 is actively receiving data signal transmissions) is to notify the SIC 240 when any "loss of signal" error, which requires interrupt processing, has occurred. However, to ensure that the transition in the SDI 221 during the active state is actually indicative of such a "loss of signal" error as opposed to a transient condition on channel 213 (e.g., channel electrical noise, the occurrence of certain data patterns, etc., interpreted by the signal detector 215 as short duration "loss of signal" events), the signal controller 250 delays switching of the ICS 223 from the first logic value to the second logic value, which will trigger interrupt processing by the SIC 240. That is, the ICS 223 is not switched until a predetermined time period has elapsed. The predetermined time period can, for example, be the same predetermined time period (i.e., the debounce time window) used with respect to the EDI 222.

Figure 3:
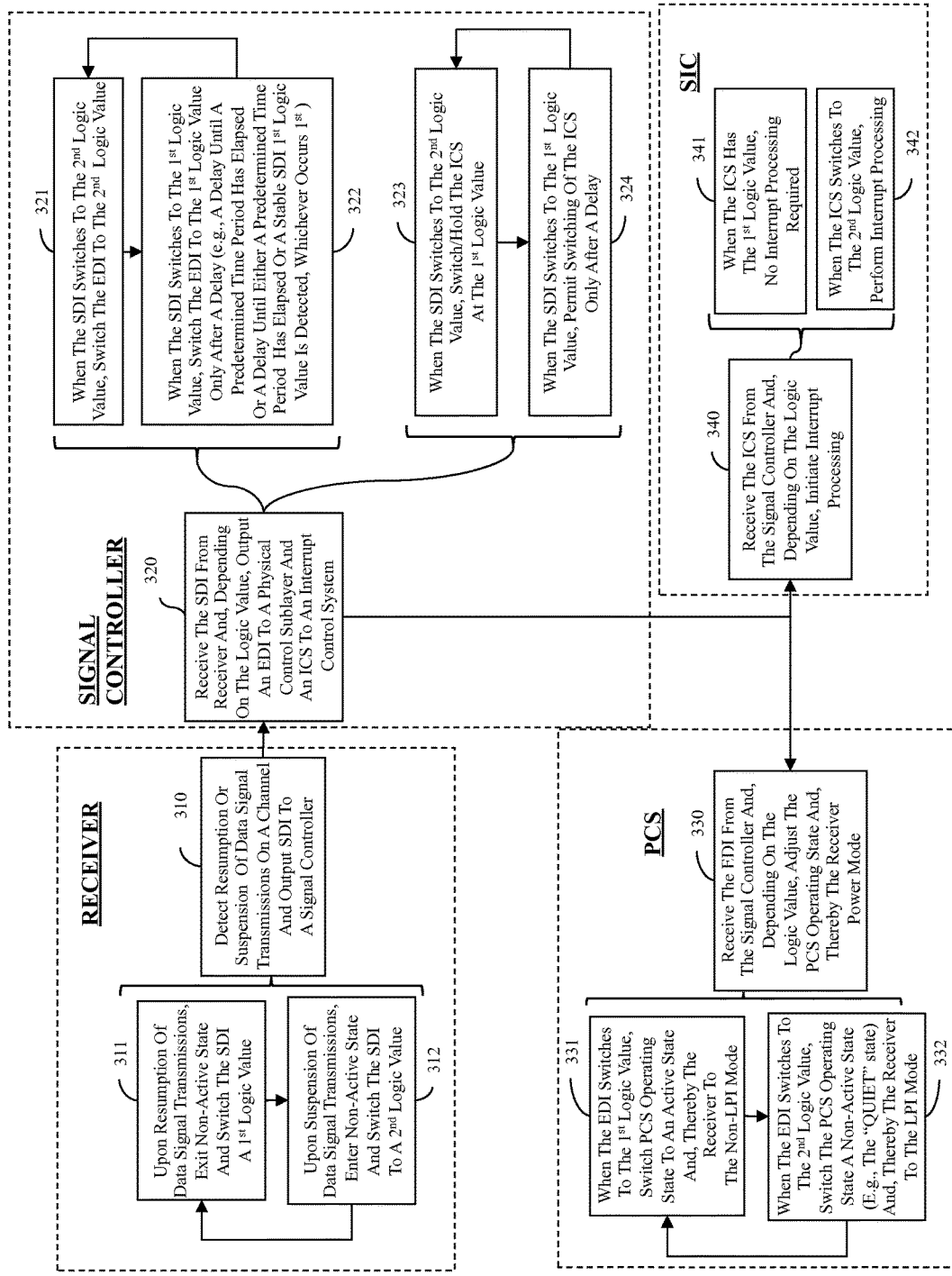
FIG. 3 is a set of flow diagrams illustrating process steps performed by the components of the receiver-side structure of the high-speed link of FIG. 2.

Also disclosed herein are embodiments of a method of operating an energy-efficient high-speed link (e.g., a high-speed serial (HSS) link) that allows for high-speed transmission of data between computer devices in computer network technologies (e.g., Energy Efficient Ethernet (EEE) or Energy Efficient Fibre Channel (FC-EE) technologies) and, particularly, embodiments of a method of operating the receiver-side of such a high-speed link. FIG. 3 contains a flow diagram illustrating the various method steps performed by the structure 200 and, particularly, by specific components of the structure 200 including the receiver 212, the signal controller 250, the physical control sublayer (PCS) 230 and the interrupt control system (ICS) 240.

Referring to the set of flow diagrams in FIG. 3 in combination with FIG. 2, the method steps can include receiving, by a receiver 212, data signals that are transmitted by a transmitter 211 over a channel 213 that connects the transmitter 211 and receiver 212. Transmission of such data signals by the transmitter 211 can be intermittent. Thus, the method can include detecting, by a signal detector 215 of the receiver 212, either resumption of data signal transmissions (311) on the channel 213 or suspension of such data signal transmissions (312) and outputting a signal detect indicator (SDI) 221 (also referred to herein as SYNC_SIGDET), the logic value of which varies depending upon whether data signal transmissions have been detected or whether the suspension of data signal transmissions has been detected (310). The method can further include receiving of the SDI 221 by the signal controller 250 and outputting of both an energy detect indicator (EDI) 222 (also referred to herein as ENERGY_DETECT) and a signal detect interrupt control signal (ICS) 223 (also referred to herein as NON_LPI_SIGDET) by the signal controller 250 (320). As discussed in greater detail below, the logic values of the EDI 222 and the ICS 223 can vary depending upon the logic value of the SDI 221. The method can further include receiving of the EDI 222 by the PCS 230, wherein the operating state of the PCS 230 and, thereby the power mode of the receiver 212, can be adjusted based, at least in part, on the logic value of the EDI 222 (330). Specifically, as mentioned above, the PCS 230 can be in the form of a finite state machine (FSM) having different operating states which cause a power supply system to supply the receiver 212 with different amounts of power (i.e., which cause the receiver to operate in different power modes). The PCS 230 can transition between the different operating states based, at least in part, on the logic value of the EDI 222. Finally, the method can include receiving of the ICS 223 by the SIC 240 and processing, by the SIC 240, interrupts based on the logic value of the ICS 223 (340).

More specifically, at process 310, when the resumption of data signal transmissions is detected, the receiver 212 and, particularly, the signal detector 215 can switch the SDI 221 to a first logic value (e.g., a logic value of "1") (311). However, when suspension of data signal transmissions is detected, the receiver 212 and, particularly, the signal detector 215 can switch the SDI 221 to a second logic value (e.g., a logic value of "0") (312).

At process 320, the SDI 221 can be received by the signal controller 250 and transitions in the SDI 221 can be detected by the signal controller 250, causing the signal controller 250 to make corresponding transitions in the EDI 222. For example, when a transition from the first logic value (e.g., the logic value of "1") to the second logic value (e.g., the logic value of "0") is detected in the SDI 221, a similar transition from the first logic value to the second logic value can occur in the EDI 222 and vice versa (see more detailed discussion below) (321)-(322).

At process 330, the EDI 222 is received as an input by the PCS 230 from the signal controller 250 and based at least in part on the logic value of the EDI 222, the operating state of the PCS 230 can be changed, thereby changing the amount of power supplied by a power supply system to the receiver 212 (i.e., thereby changing the power mode of the receiver). Specifically, as mentioned above, the PCS 230 can have one or more non-active states (including, but not limited to, a "QUIET" state) that cause a power supply system of the second computer device 202 to supply a relatively low amount of power to the receiver 212 (i.e., to cause the receiver 212 to operate in a low power idle (LPI) mode). The PCS 230 can further have an active state that causes the power supply system to increase the amount of power supplied to the receiver to an amount sufficient for normal operation (i.e., to cause the receiver 212 to operate in a non-LPI mode). The EDI 222 can be an input to the PCS 230 and, depending upon the logic value of the EDI 222, can cause the operating state of the PCS 230 to remain in or exit a non-active state (e.g., the "QUIET" state). Thus, at process 330, the method can include, when the EDI 222 has the second logic value (e.g., the logic value of "0") indicating that the receiver 212 is not receiving data signal transmissions (i.e., indicating that the receiver 212 is in a quiescent state), causing the PCS 230 to remain in a non-active state (e.g., the "QUIET" state), thereby causing the receiver 212 to remain in the LPI-mode for maximum energy savings. The method can further include, when the EDI 222 has the first logic value (e.g., the logic value of "1") indicating that the receiver 212 is receiving data signal transmissions, causing the PCS 230 to exit the non-active state (e.g., the "QUIET" state), pass through other non-active states (if applicable) and eventually enter an active state, thereby causing the receiver 212 to operate in the non-LPI mode. Thus, the different PCS 230 operating states allow for energy savings when data signal transmissions from the transmitter 211 to the receiver 212 have been suspended and the receiver 212 is no longer active (i.e., is in a quiescent state) and, thereby no longer in need of full power to operate.

However, in order to ensure that the PCS 230 remains in the non-active state and, particularly, the "QUIET" state such that the receiver 212 remains in the LPI mode upon detection of suspension of data signal transmissions from the transmitter 211 (e.g., upon detection of loss of synchronization with the transmitter 211) (e.g., even in the event that the signal detect indicator 221 transitions from the second logic value to the first logic value early) and also to ensure that the PCS 230 does not prematurely exit that non-active state (e.g., even in the event that the signal detect indicator 221 is initially metastable), process 320 is performed by the signal controller 250 subject to certain conditions. Specifically, once the SDI 221 and, thereby the EDI 222 transitions from the first logic value (e.g., the logic value of "1") to the second logic value (e.g., the logic value of "0") causing the PCS 230 to remain in the non-active state (e.g., the "QUIET" state) and, thereby causing the receiver 212 to remain in the LPI-mode, any subsequent transition of the EDI 222 back to the first logic value will be delayed at step 322, according to predefined rules. For example, the delay at step 322 can be until a predetermined time period (also referred to herein as a debounce time window) has elapsed since detection of the SDI 221 transition to the first logic value. Alternatively, the delay can be until either the predetermined time period has elapsed or a stable signal detect indicator first logic value is detected (i.e., until logic in the signal controller 250, referred to herein as "one detect logic" determines that the first logic value of the signal detect indicator 221 is stable), whichever comes first. It should be noted that the predetermined time period (i.e., the debounce time window) used to delay transition of the EDI 222 back to the first logic value can be adjustable in order to optimize power savings and performance (i.e., to maximize power savings, while avoiding or minimizing any performance degradation). Specifically, as discussed in detail above with regard to the structure 200, the predetermined time period can be set manually by a user or can be set automatically and dynamically by the signal controller 250.

Additionally, as mentioned above, an ICS 223 (also referred to herein as NON_LPI_SIGDET) is also output by the signal controller 250 at process 320. This ICS 223 is received at process 340 by the SIC 240, which controls interrupt processing based on the logic value of the ICS 223. For example, when the logic value of the ICS 223 is the first logic value (e.g., the logic value of "1"), no interrupt processing for a "loss of signal" error by the SIC 240 is required (341). However, when the logic value of the ICS 223 transitions from the first logic value to the second logic value, interrupt processing will be performed by the SIC 240 in order to account for any "loss of signal" errors (342). Specifically, at process 320, the ICS 223 can be generated and output by the signal controller 250 such that, when the SDI 221 and EDI 222 have the second logic value, the PCS 230 is in the non-active state (e.g., the "QUIET" state) and the receiver 212 is in the LPI mode, the logic value of the ICS 223 is held at the first logic value (e.g., a logic value of "1") (323). This is because, when the PCS 230 is in the non-active state (e.g., the "QUIET" state) and the receiver 212 is operating in the LPI mode, transitions in the SDI 221 may occur (e.g., due to metastability following transition to the second logic value), but such transitions are not indicative of any "loss of signal" error requiring interrupt processing. Only when the PCS 230 has exited the non-active state (e.g., the "QUIET" state) and the receiver 212 is operating in the non-LPI mode (i.e., when the SDI 221 has transitioned back to the first logic value) is the logic value of the ICS 223 permitted to transition to the second logic value (e.g., a logic value of "0") in response to a transition detected in the SDI 221 (324). It should be noted that the purpose of the ICS 223 during the active state of the PCS 230 and non-LPI mode of the receiver 212 (i.e., when the receiver 212 is actively receiving data signal transmissions) is to notify the SIC 240 when any "loss of signal" error, which requires interrupt processing, has occurred. However, to ensure that the transition in the SDI 221 during the active state is indicative of such a "loss of signal" error as opposed to a transient condition on channel 213 (e.g., channel electrical noise, the occurrence of certain data patterns, etc, interpreted by the signal detector 215 as short duration "loss of signal" events), switching of the ICS 223 at process 324 is delayed. That is, the ICS 223 is not switched at process 324 from the first logic value to the second logic value, which will trigger interrupt processing by the SIC 240, until a predetermined time period has elapsed. The predetermined time period can, for example, be the same predetermined time period (i.e., the debounce time window) used with respect to the EDI 222.

Figure 4:
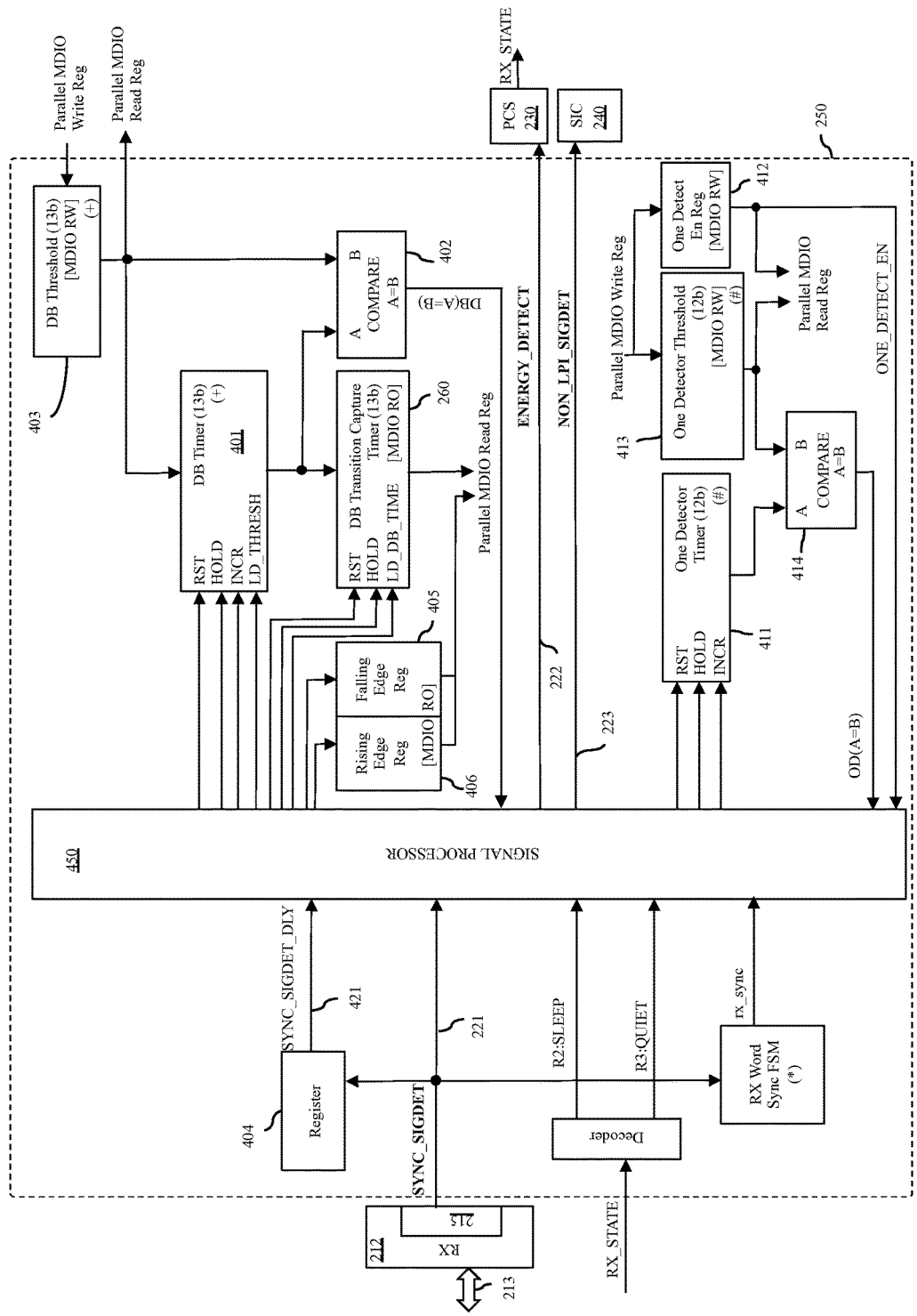
FIG. 4 is schematic diagram illustrating exemplary circuitry that can be used to implement the receiver-side structure and, particularly, the signal controller of FIG. 2.
Figure 5:
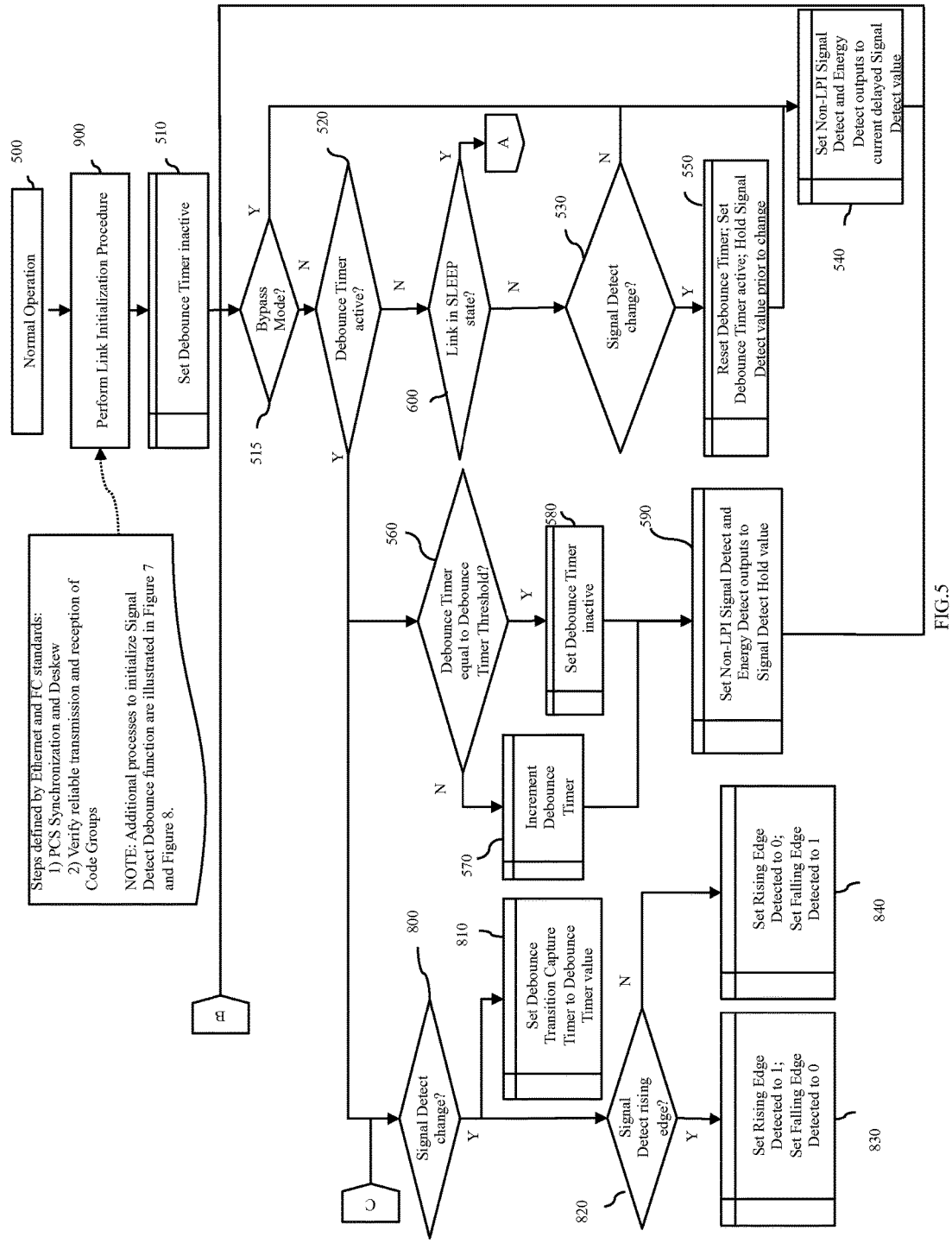
FIGS. 5-6 are flow diagrams illustrating operation of the receiver-side structure of FIG. 4.
Figure 6:
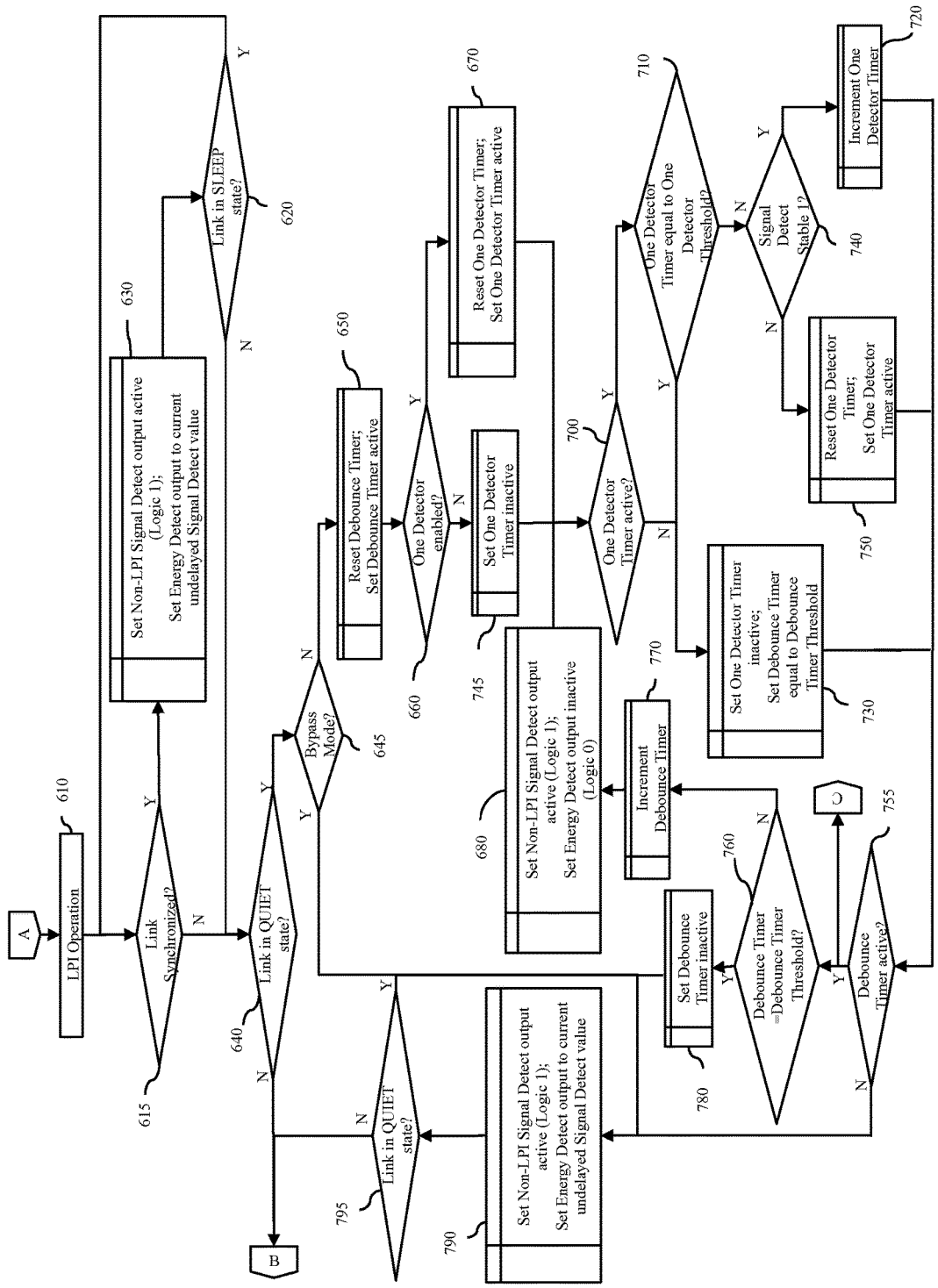
Figure 7:
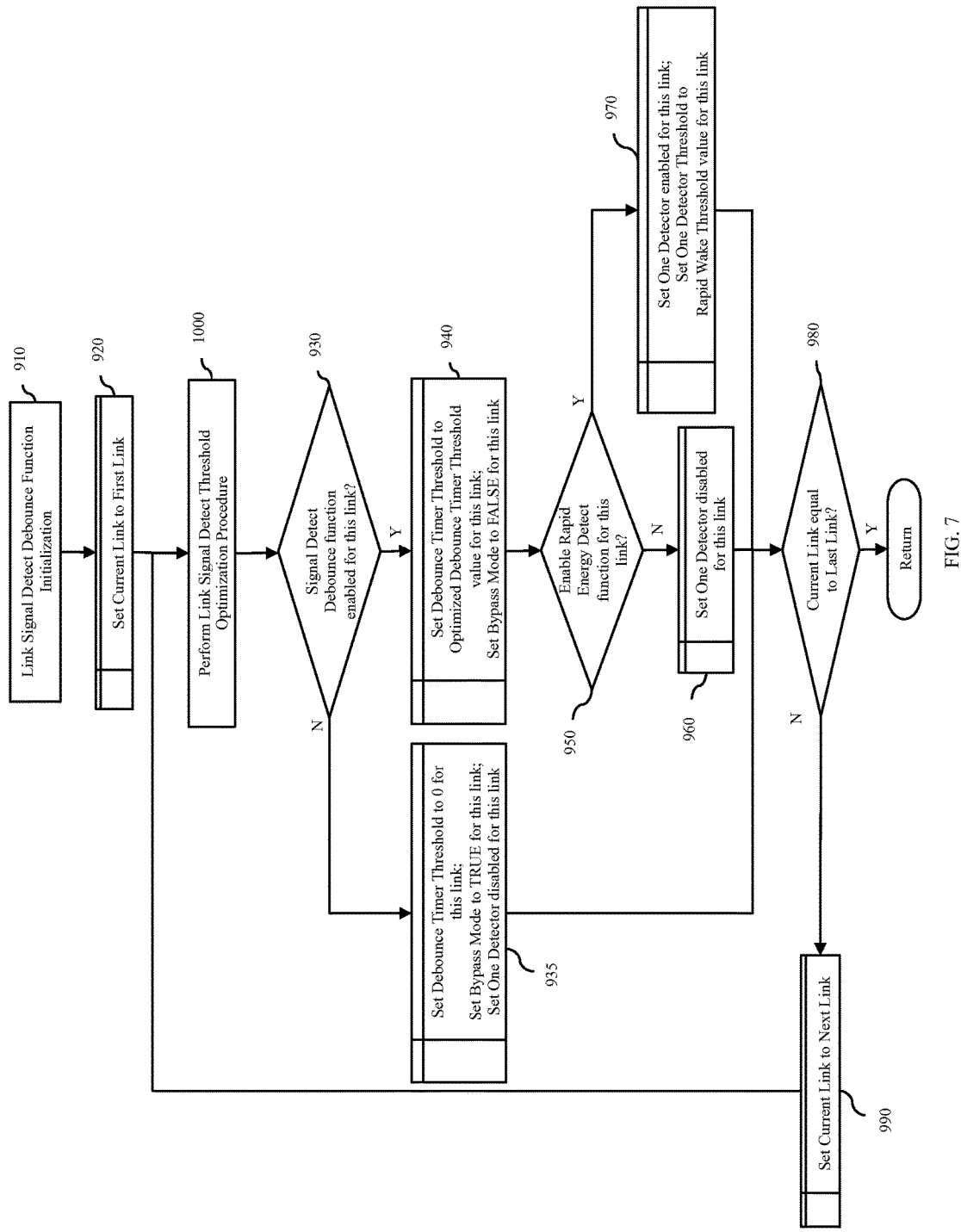
FIG. 7 is a flow diagram illustrating in greater detail the processes used to perform step 900 of FIG. 5.
Figure 8:
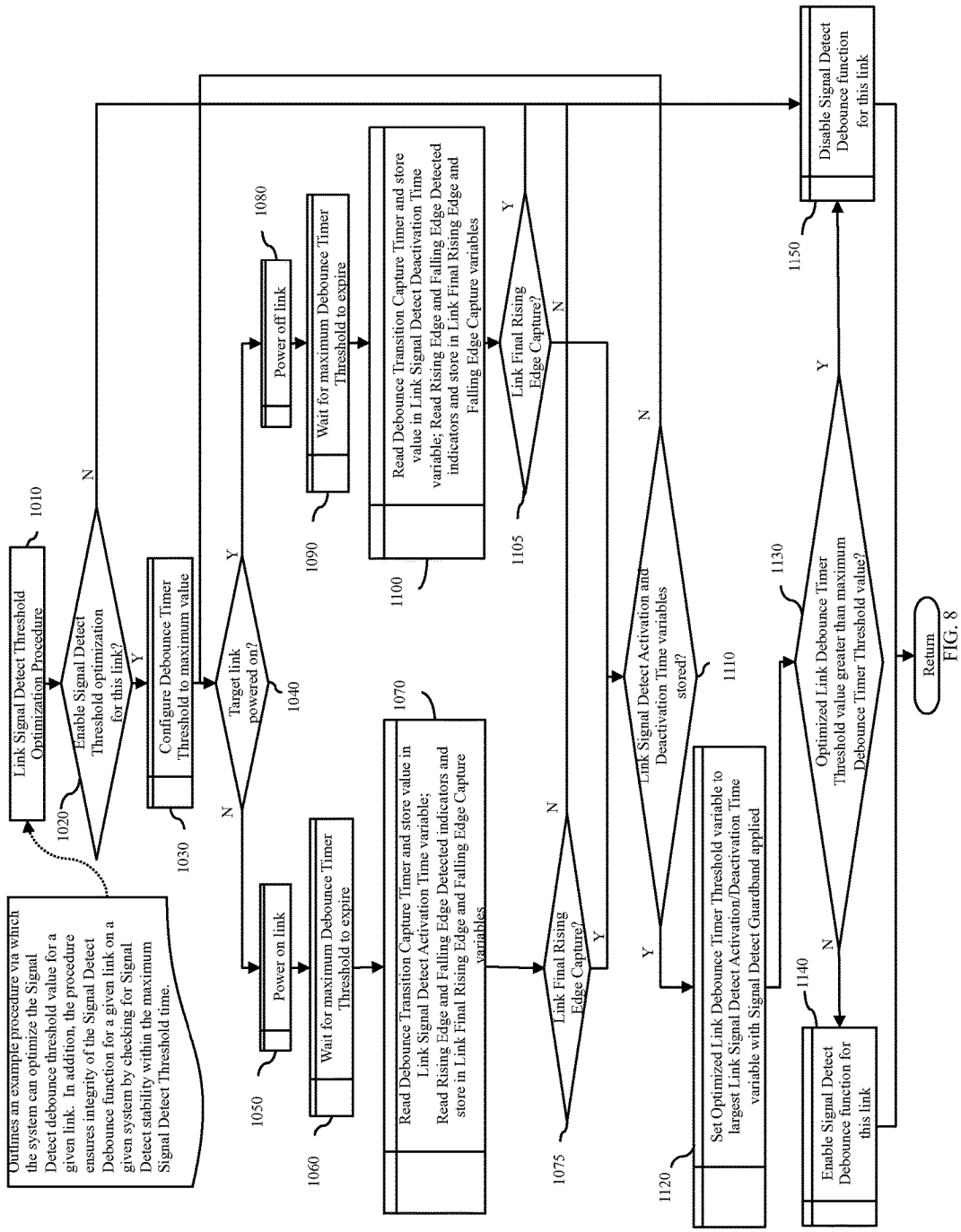
FIG. 8 flow diagram illustrating in greater detail the processes used to perform step 1000 of FIG. 7; and, FIG. 9 is a diagram illustrating an exemplary link list.

FIG. 4 is schematic diagram illustrating, in greater detail, exemplary circuitry that can be used to implement the receiver-side structure 200 and, particularly, the signal controller 250 of the energy-efficient high-speed link shown in FIG. 2. FIGS. 5-8 are flow diagrams illustrating the operations performed with respect to the circuitry shown in FIG. 4. Specifically, FIG. 5 and FIG. 6 illustrate operation of the invention within the context of overall system operation. FIG. 7 illustrates in greater detail the processes used to perform step 900 of FIG. 5. FIG. 8 illustrates in greater detail the processes used to perform step 1000 of FIG. 7. The following table (Table 1) defines the variables used in the steps shown in FIGS. 5-8. It should be noted that in this Table 1 the "Variable Name" refers to the item identifiers used in the detailed description of the circuitry and flow diagrams of FIGS. 4-8 below. Additionally, in this Table 1 the "Type" of variable can refer to an Input variable (i.e., an input to the disclosed circuitry), an Output variable (i.e., an output to the disclosed circuitry), an Internal variable (i.e., a variable that is internal to the disclosed circuitry), and a System variable (i.e., an external system variable that supports usage of the disclosed circuitry).

TABLE 1

| Variable Name | Type | Description |
| --- | --- | --- |
| Debounce Timer (Debounce Timer) | Internal | Times a given Signal Detect debounce event on the associated link. |
| Debounce Timer Threshold (Debounce Threshold) | Internal | Threshold value against which the Debounce Timer is compared to determine the duration of a given Signal Detect debounce event on the associated link; User configurable. |
| Undelayed Signal Detect (SYNC_SIGDET) | Input | Generated by the associated link's receiver side to indicate presence or absence of a signal on the link. Also called "Signal Detect". |
| Delayed Signal Detect (SYNC_SIGDET_DLY) | Internal | Delayed version of the associated link's Undelayed Signal Detect input. |
| Signal Detect Change (SYNC_SIGDET XOR SYNC_SIGDET_DLY) | Internal | Indicates when the associated link's value of Undelayed Signal Detect is different from Delayed Signal Detect. |
| Signal Detect Hold (SIGDET_Hold) | Internal | Preserves the last value of the associated link's Delayed Signal Detect prior to Signal Detect Change being TRUE when the Debounce Timer is not active. |
| Non-LPI Signal Detect (NON_LPI_SIGDET) | Output | Debounced Signal Detect output by the invention for system use as the associated link's Signal Detect indicator. |
| Energy Detect (ENERGY_DETECT) | Output | Output by the invention for system use to control when the associated link's receiver side State Machine exits the QUIET state of energy-efficient operation. |
| Debounce Transition Capture Timer (DB_Transition_Timer_Capture) | Internal | When the Debounce Timer is active for the associated link, records the last Debounce Timer value when Signal Detect Change was TRUE. (System read access via MDIO interface) |
| Rising Edge Detected (Rising Edge Reg or Rising Edge Transition Capture Register) | Internal | When the Debounce Timer is active for the associated link, indicates if the last Signal Detect Change was a rising edge. (System read access via MDIO interface) |
| Falling Edge Detected (Falling Edge Reg or Falling Edge Transition Capture Register) | Internal | When the Debounce Timer is active for the associated link, indicates if the last Signal Detect Change was a falling edge. (System read access via MDIO interface) |
| Bypass Mode (Bypass Mode) | Internal | Operating mode of the invention in which either Undelayed Signal Detect or Delayed Signal Detect for the associated link is directly passed through as Energy Detect and (when not operating in energy-efficient states) Non-LPI Signal Detect without debounce processing. |
| SLEEP/QUIET State (R2:SLEEP/R3_QUIET) | Input | Mutually-exclusive link states indicating when the receive side of the associated link is in one of its energy-efficient operating states (referred to in the invention as "LPI mode"). |
| Signal Detect Stable 1 (SYNC_SIGDET AND SYNC_SIGDET_DLY) | Internal | Indicates when the values of Undelayed Signal Detect and Delayed Signal Detect are Logic 1 (i.e. Signal Detect is sampled as stable Logic 1 value) on the associated link. |
| Signal Detect Rising Edge (SYNC_SIGDET AND !SYNC_SIGDET_DLY) | Internal | Indicates when the values of Undelayed Signal Detect is Logic 1 and Delayed Signal Detect is Logic 0 (i.e. Signal Detect transitions from 0 to 1) on the associated link. |
| One Detector Enable (ONE_DETECT_EN) | Internal | Controls whether or not the One Detector Timer for the associated link is enabled to operate when the Debounce Timer is active during the QUIET state of energy-efficient operation to support the Rapid Energy Detect function of the invention; User configurable. |
| One Detector Timer (One Detector) | Internal | When the Debounce Timer is active during the QUIET state, times the logic 1 duration of each Undelayed Signal Detect pulse event on the associated link up to the One Detector Threshold value. |
| One Detector Threshold (One Threshold) | Internal | When the Debounce Timer is active during the QUIET state, provides the threshold value against which the One Detector Timer is compared to declare the associated link's Undelayed Signal Detect input has achieved a stable logic 1 value; User configurable. |
| Current Link | System | Identifies the link (via the Link ID field of) whose Signal Detect Debounce function parameters are currently being initialized. |
| First Link | System | Within a list of available links in the system, identifies the first link to be initialized. |
| Next Link | System | Within a list of available links in the system, identifies the next link (via the Link ID field of) to be initialized. |
| Last Link | System | Within a list of available links in the system, identifies the final link to be initialized. |
| Signal Detect Debounce Function Enable | System | Within a list of available links in the system, identifies whether or not the Signal Detect Debounce function is enabled for a given link. (Output by FIG. 8, Input to FIG. 7) |
| Rapid Energy Detect Function Enable | System | Within a list of available links in the system, identifies whether or not the Rapid Energy Detect function is enabled for a given link. (Input to FIG. 7) |
| Rapid Wake Threshold | System | Within a list of available links in the system, used to configure the One Detector Threshold value. (Input to FIG. 7) |

TABLE 1-continued

| Variable Name | Type | Description |
| --- | --- | --- |
| Signal Detect Threshold Optimization Enable | System | Within a list of available links in the system, identifies whether or not the Signal Detect Threshold Optimization procedure is to be executed for a given link. (Input to FIG. 8) |
| Signal Detect Activation Time | System | After powering on a given link, stores the time duration (up to the maximum Debounce Timer Threshold value) computed by the invention from the first to the last detected Signal Detect Change. (Output by FIG. 8) |
| Signal Detect Deactivation Time | System | After powering off a given link, stores the time duration (up to the maximum Debounce Timer Threshold value) computed by the invention from the first to the last detected Signal Detect Change. (Output by FIG. 8) |
| Final Rising Edge Capture | System | After powering either off or on a given link, indicates if the last detected Signal Detect Change was a rising edge. |
| Final Falling Edge Capture | System | After powering either off or on a given link, indicates if the last detected Signal Detect Change was a falling edge. |
| Optimized Debounce Timer Threshold | System | Stores the optimal Debounce Timer Threshold value within which the Signal Detect indicator will reach a stable value when changing a given link's power state. (Output by FIG. 8, Input to FIG. 7) |
| Signal Detect Guardband | System | Defines additional margin applied to a given link's Signal Detect Activation Time and Signal Detect Deactivation Time to ensure the Optimized Debounce Timer Threshold value properly accounts for system uncertainties which can extend Signal Detect stabilization time. Examples of such system uncertainties include voltage and temperature variation, semiconductor process variation, performance degradation over time, etc. (Input to FIG. 8) |

As mentioned above, FIG. 5 and FIG. 6 illustrate operation of the disclosed receiver-side structure of a high-speed link within the context of overall system operation. Specifically, steps 510 through 840 of FIG. 5 and steps 615 through 795 of FIG. 6 are performed for a single high-speed link by circuitry shown in FIG. 4 used to implement the receiver-side structure 200 and, particularly, the signal controller 250 of FIG. 2 within a system. The sets of steps shown in FIGS. 5 and 6 and performed by the circuitry illustrated in FIG. 4 can be used to resolve a single value of the ICS 223 (also referred to as the NON_LPI_SIGDET) and the EDI 222 (also referred to as the ENERGY_DETECT) outputs of the signal controller 250 performed in one clock cycle. For example, assuming continuous active mode (i.e., non-LPI mode) operation of the receiver 212 as defined in FIG. 5, the initial path starting at step 510 and ending at either step 540 or step 590 can be performed in one clock cycle, and each subsequent path starting at step 515 and ending at either step 540 or step 590 can also be performed in one clock cycle. Similarly, assuming continuous LPI mode operation of the receiver 212 as defined in FIG. 6, the set of steps comprising a given path ending at either step 630, step 680 or step 790 can be performed in one clock cycle. Additionally, as mentioned above, FIG. 7 defines the steps performed by the system in the preferred embodiment as part of the procedure to initialize all system high-speed links identified in step 900 of FIG. 5. Step 1000 of FIG. 7 includes steps 1020 through 1150 of FIG. 8, which are performed by the system to optimize a given link's signal detect threshold value, thereby helping optimize overall system performance. Note that, when the system performs steps 1050 through 1060 or steps 1080 through 1090 of the Signal Detect Threshold value optimization procedure described in FIG. 8 for a given link, steps 510 through 840 of FIG. 5 are concurrently performed by the circuitry of FIG. 4, and the final result of steps 810, 830 and 840 provides the system with the information required to determine the optimal signal detect threshold value for that link.

More specifically, as mentioned above, FIG. 5 illustrates process steps executed by signal controller 250 when the receiver 212 is actively receiving data signal transmissions and, thereby operating in the non-LPI mode. These process steps start with a system initializing all high-speed links (e.g., Energy Efficient Ethernet (EEE) high-speed links and/or Energy Efficient Fibre Channel (FC-EE) high-speed links). The link initialization procedure (Step 900) encompasses processes described by the standards for the high-speed links (e.g., PCS synchronization and deskew, verification of reliable transmission and reception of Code Groups, etc.). In addition, systems incorporating the circuitry 400 illustrated in FIG. 4 would perform steps to initialize all user configurable flowchart variables identified in Table 1 above including, but not limited to, the debounce timer threshold, one detector enable and one detector threshold values.

Referring to FIG. 5 in combination with FIG. 4, once initialization is complete, a debounce timer 401 is placed in its inactive state (Step 510). This step corresponds to the "DB(A=B)" condition, as found by the comparator 402, in which the debounce timer register 401 value is equal to the user-configured debounce timer threshold register 403 value. Following Step 510, or following Step 540 or Step 590 to start a new clock cycle, or otherwise if Step 640 or Step 795 is FALSE (when exiting the LPI mode), a determination can be made as to whether or not the circuitry 400 of FIG. 4 is operating in a bypass mode (Step 515). This determination is made based on whether or not the debounce timer threshold register 403 value configured by the user is 0. If it is set at 0, then the answer is yes (i.e., the bypass mode is TRUE) and, if it is not set at 0, then the answer is no (i.e., the bypass mode is FALSE).

If at Step 515 it is determined that the bypass mode is FALSE, a determination is made as to whether or not the debounce timer register 401 is active (Step 520). The debounce timer register 401 is active when "!DB(A=B)" is TRUE (i.e., when the debounce timer register 401 value is not equal to the user-configured debounce timer threshold register 403 value). If Step 520 is FALSE, a determination is made as to whether or not the PCS 230 is in a non-active state and, particularly, the "SLEEP" state (Step 600). Those skilled in the art will recognize that the "SLEEP" state is one of the non-active states of the PCS 230 that cause the receiver 212 to operate in the LPI mode and is provided for in the EEE and FC-EE provisions of the Ethernet and Fibre Channel standards, respectively, for high-speed links which support energy-efficient operation.

If Step 600 is TRUE, this is an indication that the PCS 230 has entered an energy-efficient operating state, thereby causing the receiver 212 to begin operation in the LPI mode (Step 610). For a description of the LPI mode, see FIG. 6 discussed in detail below. Otherwise, if Step 600 is FALSE, a determination is made as to whether or not a change is detected in the value of the SDI 221 (Step 530). This check is performed by comparing the values of the undelayed SDI 221 (SYNC_SIGDET) and a delayed SDI 421 (SYNC_SIGNET_DLY) output by a delayed signal detect register 404. If Step 530 is TRUE, the debounce timer register 401 is reset and, particularly, placed in its active state, and the SDI 221 (SYNC_SIGDET) value prior to the detected change (i.e., the delayed SDI 421 (SYNC_SIGDET_DLY)) is held (Step 550). Resetting the debounce timer register 401 causes a change in the debounce comparator 402 output from "DB(A=B)" to "!DB(A=B)", thereby causing the debounce timer register 401 to be placed in its active state. Additionally, the pre-change value of the SDI 221 (i.e., the delayed SDI 421 (SYNC_SIGDET_DLY)) is stored in a signal detect hold register contained in a signal processor 450 of the signal controller 250.

Following Step 550, or otherwise if Step 515 is TRUE or Step 530 is FALSE, activity for the current clock cycle ends with the ICS 223 (NON_LPI_SIGDET) and EDI 222 (ENERGY_DETECT) outputs of the signal processor 450 being set to the current clock cycle delayed SDI 421 (SYNC_SIGDET_DLY) value (Step 540). During the active mode (i.e., the non-LPI mode), the delayed SDI 421 (SYNC_SIGDET_DLY) is selected to prevent the system from recognizing the following events: (1) false loss of signal (when the SDI transitions from a logic value of "1" to a logic value of "0") indications (e.g., those caused by short losses of signal on the link, power supply noise, etc.); and (2) multiple signal detect transitions which may occur for a single loss of signal or signal detect event. Otherwise, if Step 520 is TRUE, the following two steps are performed in parallel: (1) a determination is made as to whether or not a change is detected in the value of the SDI 221 (SYNC_SIGDET) (Step 800) in the same manner as described in Step 530; and (2) a determination is made as to whether or not the debounce timer register 401 value is equal to the debounce timer threshold register 403 value (Step 560). This determination is made by the debounce comparator 402 and it is TRUE when "DB(A=B)" or FALSE when "!DB(A=B)".

If Step 800 is TRUE, the debounce transition capture timer register 260 value is set to the current debounce timer 401 value (Step 810). Specifically, the debounce transition capture timer register 260 captures the current debounce timer register 401 output. In addition, whether or not the SDI 221 change is a rising edge (i.e., delayed SDI 421 (SYNC_SIGDET_DLY) at a logic value of "0" and undelayed SDI 221 (SYNC_SIGDET) at a logic value of "1") is checked (Step 820), and a rising edge detected indicator and a falling edge detected indicator output by the rising edge register 406 and falling edge register 405, respectively, are set accordingly. Specifically, if Step 820 is TRUE (indicating a rising edge), the rising edge detected indicator is set to logic "1" and the falling edge detected indicator is set to logic "0" (Step 830). Otherwise, if Step 820 is FALSE (indicating a falling edge), the rising edge detected indicator is set to logic "0" and the falling edge detected indicator is set to logic "1" (Step 840). In both active mode and the LPI mode, the debounce transition capture timer register 260, rising edge register 406, and falling edge register 405 hold their values until a subsequent transition in the SDI 221 occurs while the debounce timer 401 is active. The debounce transition capture timer register 260, rising edge register 406, and falling edge register 405 may be subsequently read back by the system (via the MDIO interface) in order to determine the last time a change in SDI 221 occurred, and whether that change was a rising or falling edge, during a given SDI 221 debounce time period. This read back capability is available to the system not only to determine the optimal debounce timer threshold 403 value during the link initialization procedure (via Step 510, FIG. 7 and FIG. 8), but also to monitor on an on-going basis whether or not the currently configured debounce timer threshold 403 value provides an adequate debounce time period based on system operating conditions and uncertainties (e.g., voltage and temperature variation, semiconductor process variation, performance degradation over time, etc.). If Step 560 is FALSE, it indicates that a debounce time period is in progress, and the debounce timer register 401 is incremented (Step 570). Otherwise, if Step 560 is TRUE, it indicates a debounce time period has expired, and the debounce timer is placed in its inactive state (Step 580). When Step 560 is TRUE, it indicates a debounce comparator 402 output state change from "!DB(A=B)" to "DB(A=B)", thereby causing the debounce timer register 401 to be placed in its inactive state.

Following either Step 570 or Step 580, activity for the current clock cycle ends with the ICS 223 (NON_LPI_SIGDET) and EDI 222 (ENERGY_DETECT) outputs of the signal processor 450 being set to the value of the SDI 221 held immediately preceding the most recently identified change in the SDI 221 (Step 590). In the context of the flowchart, the most recently identified change in the SDI 221 corresponds to the last time Step 530 was TRUE. The value of the SDI 221 held immediately preceding the most recently identified change in the SDI 221 is the value of the delayed SDI 421, which was stored in a signal detect hold register contained in the signal processor 450 at the last clock cycle when Step 530 was executed and TRUE. Following either Step 540 or Step 590, activities for a new clock cycle begin, starting with Step 515.

As mentioned above, FIG. 6 illustrates steps executed by the circuitry of FIG. 4 during low power idle (LPI) mode operation of the receiver 212. LPI mode operation is initiated when Step 600 of FIG. 5 is TRUE, indicating the PCS 230 is in a non-active state and, particularly, the "SLEEP" state. More specifically, referring to FIG. 6 in combination with FIG. 4, LPI mode operation starts with checking whether or not the receiver side of the link is correctly synchronized with the remote transmitter (Step 615). The conditions defining such synchronization are defined in the EEE and FC-EE provisions of the Ethernet and Fibre Channel standards, respectively. Note that checking for loss of receiver-side synchronization (when Step 615 is FALSE) with the remote transmitter while in the "SLEEP" state allows the circuit to recognize when the PCS 230 will enter another non-active state and, particularly, the "QUIET" state for energy-efficient operation (as prescribed in the EEE and FC-EE provisions of the Ethernet and Fibre Channel standards, respectively). If Step 615 is TRUE, activity for the current clock cycle ends with the ICS 223 (NON_LPI_SIGDET) output from the signal processor 450 being set to logic "1" and the EDI 222 (ENERGY_DETECT) output from the signal processor 450 being set to the SDI 221 (SYNC_SIGDET) value (Step 630). When the remote transmitter has suspended data transmissions on the channel 213, the receiver-side SDI 221 will transition to logic "0" during such time periods. To prevent the system from incorrectly recognizing and recording this event as a link error, requiring interrupt processing by the SIC 240 and taking associated error recovery actions, the signal processor 450 sets the ICS 223 (which is input into the SIC 240 instead of the SDI 221) to logic "1". For continuity in support of the fastest possible receiver-side wake-up time (indicated in Step 790 when the SDI 221 (SYNC_SIGDET) transitions from logic "0" to logic "1"), the signal processor 450 sets the EDI 222 output to the value of the undelayed SDI 221 (SYNC_SIGDET).

Following Step 630, activity for a new clock cycle begins by checking whether or not PCS 230 is still in the non-active state and, particularly, the "SLEEP" state (Step 620). If Step 620 is TRUE, execution continues with Step 615 as previously described. Otherwise, if either Step 620 or Step 615 is FALSE, a determination is made as to whether or not the PCS 230 has transitioned to another non-active state and, particularly, the "QUIET" state (Step 640). The "QUIET" state is another state of the PCS 230 provided for by the EEE and FC-EE provisions of the Ethernet and Fibre Channel standards, respectively, for links that support energy-efficient operation. When in the "QUIET" state, the remote transmitter is permitted to suspend signaling across the channel 213 for up to a maximum amount of time (on the order of milliseconds) as specified by the EEE and FC-EE provisions of the Ethernet and Fibre Channel standards, respectively. If Step 640 is TRUE (indicating the receiver-side PCS 230 of the link is in the "QUIET" state), in anticipation of the remote transmitter suspending signaling across the channel, subsequent steps are taken to debounce and monitor the SDI 221 (SYNC_SIGDET) based on how the system has configured the signal controller 250. The first step is to check whether or not the invention is configured for bypass mode operation (Step 645). If Step 645 is FALSE, the debounce timer register 401 is reset and the debounce timer register 401 is placed in its active state (Step 650).

Following Step 650, a determination is made as to whether or not the system has enabled operation of a one detector timer register 411 (Step 660). This is determined via the state of a one detect enable register 412. If Step 660 is TRUE, the one detector timer register 411 is reset and the one detector timer register 411 is placed in its active state (Step 670). It should be noted that whenever a one detector threshold register 413 is configured by the user to a non-zero value, resetting the one detector timer register 411 causes a change in a one detector comparator 414 output from "OD(A=B)" to "!OD(A=B)", thereby causing the one detector timer register 411 to be placed in its active state. Otherwise, if Step 660 is FALSE, the one detector timer register 411 is placed in its inactive state (Step 745). This step corresponds to the "OD(A=B)" condition in which the one detector timer register 411 value is equal to the user-configured one detector threshold register 413 value.

Following either Step 670, Step 745 or Step 680, whether or not the one detector timer register 411 is active is checked (Step 700). If Step 700 is TRUE, it indicates a rapid energy detect function for this link is enabled (see Step 950 discussed in greater detail below), which initiates Steps 710, 720, 730, 740 and 750 related to the one detector circuitry. Whether or not the one detector timer register 411 value is equal to the one detector threshold register 413 value is checked (Step 710). This check is performed by the one detector comparator 414 and is TRUE when "OD(A=B)" or FALSE when "!OD(A=B)". If Step 710 is FALSE, the one detector timer register 411 value has not reached the one detector threshold register 413 value. This indicates the threshold number of consecutive clock cycles during which the SDI 221 is at a logic "1" level, indicative of the remote transmitter-side exiting its "QUIET" state early during the receiver-side debounce time period, has not been attained.

Whether or not the SDI 221 is at a stable logic "1" level during the current one detector sampling window is checked (Step 740). This check is performed by determining if the values of undelayed SDI 221 (SYNC_SIGDET) and the delayed SDI 421 (SYNC_SIGDET_DLY) are both logic "1". If Step 740 is TRUE, it indicates that the SDI 221 is at a stable logic "1" level during the current one detector sampling window. This causes the one detector timer register 411 value to be incremented (Step 720). Otherwise, if Step 740 is FALSE, it indicates the SDI 221 is not at a stable logic "1" level during the current one detector sampling window. This causes the one detector timer register 411 value to be reset, and the one detector timer register remains in its active state (Step 750). Otherwise, if Step 710 is TRUE, the one detector timer register 411 value has reached the one detector threshold register 413 value. This indicates the threshold number of consecutive clock cycles during which SDI 221 is at a logic "1" level, indicative of the remote transmitter side exiting its "QUIET" state early during the receiver-side debounce time period, has been attained. The one detector timer register 411 is set to its inactive state, and the debounce timer register 401 value is set equal to the debounce timer threshold register 403 value (Step 730). Based on the continuous duration of SDI 221 stability at the logic "1" level, the latter action subsequently causes an early end to the debounce time period (see Step 760). Otherwise if Step 700 is FALSE (indicating the rapid energy detect function for this link is disabled), or following Step 720, Step 730 or Step 750 (taken when the rapid energy detect function for this link is enabled), whether or not the debounce timer register 401 is active is checked (Step 755). See also step 520. If Step 755 is TRUE, the following two steps are performed in parallel: (1) determining whether or not a change is detected in the value of SDI 221 (Step 800 of FIG. 5) in order to determine if the current debounce timer register 401 value should be stored in the debounce transition capture timer register 260, and if rising edge register 406 and falling edge register 405 should be updated; and (2) determining whether or not the debounce timer register 401 value is equal to the debounce timer threshold register 403 value is checked (Step 760). If Step 760 is FALSE, it indicates the debounce time period is in progress, and the debounce timer is incremented (Step 770).

Following Step 770, activity for the current clock cycle ends with the ICS 223 (NON_LPI_SIGDET) output from the signal processor 450 being set to logic "1" and the EDI 222 (ENERGY_DETECT) output from the signal processor 450 being set to logic "0" (Step 680). These settings apply when the PCS 230 is in a non-active state and, particularly, the "QUIET" state, bypass mode is not configured, and the debounce time period is in progress. Setting EDI 222 (ENERGY_DETECT) in this way prevents the PCS 230 from prematurely exiting the "QUIET" state and ensures that the receiver 212 remains in the LPI mode (as defined in the EEE and FC-EE provisions of the Ethernet and Fibre Channel standards, respectively) even in the event of false SDI 221 transitions from logic "0" to logic "1" when the remote transmitter-side has suspended signaling across the channel 213. Otherwise, if Step 760 is TRUE, it indicates the debounce time period has expired, and the debounce timer register 401 is placed in its inactive state (Step 780). Following Step 780, or if Step 795 is TRUE, or otherwise if either Step 645 is TRUE or Step 755 is FALSE, activity for the current clock cycle ends with the ICS 223 (NON_LPI_SIGDET) output from the signal processor 450 being set to logic "1" and the EDI 222 (ENERGY_DETECT) output from the signal processor 450 being set to the undelayed SDI 221 (SYNC_SIGDET) value (Step 790). These settings apply when the PCS 230 is in the "QUIET" state, and either bypass mode is configured or the debounce time period has expired. Following Step 790, activities for a new clock cycle begin by checking whether or not the PCS 230 remains in the "QUIET" state (Step 795). If Step 795 is TRUE, activity for the new clock cycle ends with the ICS 223 (NON_LPI_SIGDET) and EDI 222 (ENERGY_DETECT) output from the signal processor 450 according to Step 790 as previously described. Otherwise, if Step 640 or Step 795 is FALSE, it indicates that the PCS 230 is in neither the "SLEEP" state nor the "QUIET" state such that the receiver 212 has switched from operating in the LPI mode to operating in the non-LPI mode (resuming Step 515).

Figure 9:
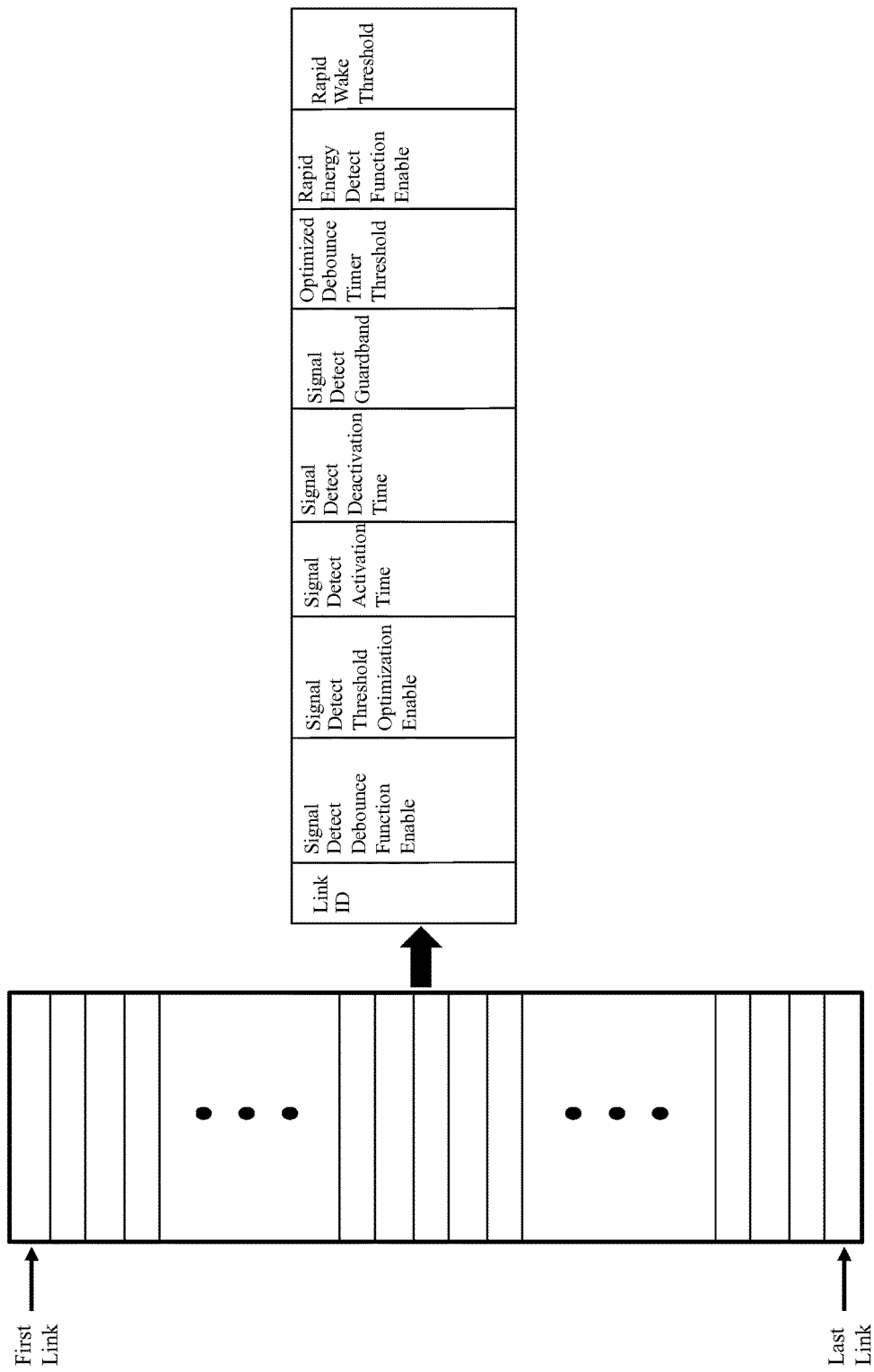

Referring to FIGS. 7 and 8 in combination with FIG. 4, at the appropriate time determined by the system in the link initialization procedure (Step 900 of FIG. 5), the system will take the necessary steps defined in FIG. 7 to initialize the user-configurable variables of the debounce function for each high-speed link that incorporates the receiver-side structure 200 of FIG. 2 and, more particularly, the circuitry for implementing that signal controller 250 as shown in FIG. 4. These user-configurable variables are the debounce timer threshold, one detector enable and one detector threshold. FIG. 8 describes the detailed flowchart steps performed by the system to complete Step 1000 of FIG. 7, which determines for a given link the validity of the debounce function, and if valid, its optimal signal detect threshold value. It should be noted that the process steps set forth in FIGS. 7 and 8 assume that the system provides a list of all links incorporating such a receiver-side structure. Additionally, each link entry in the list contains both input variables used to determine the flow of, and output variables used to hold results generated by, the procedure steps performed for each link which initialize the user-configurable variables. FIG. 9 is a diagram illustrating an exemplary link list.

The initial step performed during the link signal detect debounce function initialization illustrated in FIG. 7 is initializing the current link variable with the link ID of the First Link in the system link list shown in FIG. 9 (Step 920). Following Step 920, a link signal detect threshold optimization procedure is performed (Step 1000). The various processes required to perform step 1000 of FIG. 7 and, thereby determine settings for the signal detect debounce function enable and optimized debounce timer threshold variables, which are subsequently used in configuring the current link's signal detect debounce function, are detailed in FIG. 8. In performing the link signal detect threshold optimization procedure of Step 1000 and described in FIG. 8, a determination is made regarding whether or not this procedure is to be performed for the current link (Step 1020). This step is based on the system checking the state of the "Signal Detect Threshold Optimization Enable" field of the link list entry for the current link, as shown in FIG. 9. If Step 1020 is TRUE, the current link's debounce timer threshold is set to the maximum value allowed by the invention (Step 1030). This step causes the invention to process subsequent SDI changes via Steps 515 through 840 of FIG. 5 due to the system powering on and off the remote transmitter attached to the current link's receiver-side. The maximum allowed debounce timer threshold value is configured to ensure that the SDI 221 (SYNC_SIGDET) is provided the largest possible time window to reach its final stable value (logic "1" when powering on the link or logic "0" when powering off the link). Following Step 1030, a determination is made as to whether or not the current link is powered (Step 1040). If Step 1040 is FALSE (indicating the current link is powered off), the (local receiver's) system powers on the current link's remote transmitter (Step 1050). Depending on the location of the remote transmitter and the capability of the local receiver's system to control it, the power on sequence may be performed in any of several ways. For example, it can be performed indirectly via a power on message sent by the local receiver's system to the remote transmitter's system. It can be performed directly in "non loop-back" mode if the link's remote transmitter is a component of the local receiver's system. It can also be performed directly by reconfiguring the link to operate in "loop-back" mode so that the link's remote transmitter becomes a component of the local receiver's system. Though not preferable, the latter way provides the means to perform the signal detect optimization procedure in configuration scenarios where the local receiver's system in unable to send a link power on message to the remote transmitter's system.

As a result of powering on the current link, at least one SDI 221 (SYNC_SIGDET) change will occur at the local receiver. In turn and in parallel, this causes the signal processor 450 to activate the debounce timer (via Step 530 and Step 550 of FIG. 5), and subsequently initiate a debounce time period (via Step 520 through Step 590) of maximum duration (specified by the maximum debounce timer threshold register 402 value configured via Step 1030). During the debounce time period, the time stamp and polarity of the most recent change in the SDI 221 (SYNC_SIGDET) is captured (via Step 800 through 840 of FIG. 5) for subsequent access by the local receiver's system. Following Step 1050, the system waits for the debounce time period initiated in Step 1050 to expire (Step 1060). Based on Step 1030, the wait time corresponds to the maximum debounce timer threshold value. Following Step 1060, once the debounce time period is complete, the system reads and stores the debounce transition capture timer register 260 value and rising edge register 406 and falling edge register 405 values (Step 1070). These values provide the time stamp and polarity (rising or falling edge) of the last SDI transition detected during the debounce time period. For the link power on sequence, the debounce transition capture time is stored in the Signal Detect Activation Time field of the link list entry for the current link, as shown in FIG. 9. The values from the rising edge register 406 and falling edge register 405 are stored in the Link Final Rising Edge and Link Final Falling Edge local procedure variables, respectively, for subsequent checking. Following Step 1070, the Link Final Rising Edge and Link Final Falling Edge variables are tested to determine whether or not the last SDI change detected during the preceding debounce time period was a rising edge (Step 1075). If Step 1075 is TRUE, it indicates the last SDI change captured during the preceding debounce time period is consistent with that expected for the power on cycle applied by the system to the current link. The system then checks whether or not both the power on and off sequences for the current link have been performed (Step 1110). Otherwise if Step 1040 is TRUE (indicating the current link is powered on), the (local receiver's) system powers off the current link's remote transmitter (Step 1080). Depending on the location of the remote transmitter and the capability of the local receiver's system to control it, the power off sequence may be performed in any of several ways. For example, it can be performed indirectly via a power off message sent by the local receiver's system to the remote transmitter's system. It can be performed directly in "non loop-back" mode if the link's remote transmitter is a component of the local receiver's system. It can also be performed directly by reconfiguring the link to operate in "loop-back" mode so that the link's remote transmitter becomes a component of the local receiver's system. Though not preferable, the latter way provides the means to perform the signal detect optimization procedure in configuration scenarios where the local receiver's system in unable to send a link power off message to the remote transmitter's system.

As a result of powering off the current link, at least one SDI 221 (SYNC_SIGDET) change will occur at the local receiver. In turn and in parallel, this causes signal processor 450 to activate the debounce timer (via Step 530 and Step 550 of FIG. 5), and subsequently initiate a debounce time period (via Step 520 through Step 590) of maximum duration (specified by the maximum debounce timer threshold value configured via Step 1030). During the debounce time period, the time stamp and polarity of the most recent SDI 221 (SYNC_SIGDET) change is captured (via Step 800 through 840 of FIG. 5) for subsequent access by the local receiver's system. Following Step 1080, the system waits for the debounce time period initiated in Step 1080 to expire (Step 1090). Based on Step 1030, the wait time corresponds to the maximum debounce timer threshold value. Following Step 1090, once the debounce time period is complete, the system reads and stores the debounce transition capture timer register 260 value and the rising edge register 406 and falling edge register 405 values (Step 1100). These values provide the time stamp and polarity (rising or falling edge) of the last SDI transition detected during the debounce time period. For the link power off sequence, the debounce transition capture time is stored in the Signal Detect Deactivation Time field of the link list entry for the current link, as shown in FIG. 9. The values from the rising edge register 406 and falling edge register 405 are stored in the Link Final Rising Edge and Link Final Falling Edge local procedure variables, respectively, for subsequent checking. Following Step 1100, the Link Final Rising Edge and Link Final Falling Edge variables are tested to determine whether or not the last SDI change captured during the preceding debounce time period was a rising edge (Step 1105). If Step 1105 is FALSE, it indicates the last SDI change captured during the preceding debounce time period is consistent with that expected for the power off cycle applied by the system to the current link. The system then checks whether or not both the power on and power off sequences for the current link have been performed (Step 1110). If Step 1110 is FALSE, it indicates either the power on or power off sequence for the current link has not been completed by the system, and whether or not the current link is powered on is again checked (Step 1040). Otherwise if Step 1110 is TRUE, both the power on and power off sequences for the current link are complete, and the system sets the Optimized Debounce Timer Threshold field in the link list for the current link entry, as shown in FIG. 9, as follows (Step 1120): ODTT (cur_link)=max{SDAT(cur_link), SDDT(cur_link)}*[1+ GB (cur_link)]; where:

ODTT(cur_link)=Optimized Debounce Timer Threshold field for the current link;

SDAT(cur_link)=Signal Detect Activation Time field for the current link;

SDDT(cur_link)=Signal Detect Deactivation Time field for the current link;

GB(cur_link)=Guardband field (expressed as %) for the current link.

Following Step 1120, a determination is made as to whether or not the optimized debounce timer threshold value calculated by the system for the current link exceeds the maximum debounce timer threshold register value (Step 1130). If Step 1130 is FALSE, it indicates the optimized debounce timer threshold value calculated by the system for the current link does not exceed the maximum debounce timer threshold value, thereby ensuring the circuitry 400 of FIG. 4 will operate properly and only pass through at most one SDI transition per loss or acquisition of signal event. The signal detect debounce function for the current link is marked as enabled (Step 1140) via the system setting active (logic "1") the Signal Detect Debounce Function Enable field of the link list entry for the current link, as shown in FIG. 9, indicating the circuitry 400 of FIG. 4 will subsequently be enabled. Otherwise if Step 1020 is FALSE (indicating the signal detect threshold optimization procedure for the current link is to be skipped), or otherwise if Step 1075 is FALSE or Step 1105 is TRUE (indicating the last SDI transition captured during the preceding debounce time period is not consistent with that expected for the type of power cycle [on or off] applied by the system to the current link), or otherwise if Step 1130 is TRUE (indicating the optimized debounce timer threshold value computed by the system exceeds the capability of the circuitry 400 of FIG. 4), the signal detect debounce function for the current link is marked as disabled (Step 1150) via the system setting inactive (logic "0") the Signal Detect Debounce Function Enable field of the link list entry for the current link. It should be noted that to reach this step via Step 1075 or Step 1105, the last SDI change captured during the preceding debounce time period was either a falling edge after powering on the current link or a rising edge after powering off the current link. This indicates the actual debounce period for the current link's SDI exceeds the maximum debounce timer threshold value of the circuitry 400 of FIG. 4, suggesting the results generated by that circuitry during operation of the current link will be unpredictable (i.e. one or more SDI transitions per loss or acquisition of signal event). Therefore, use of that circuitry during current link operation is disabled.

Following Step 1140 or Step 1150, the link signal detect threshold optimization for the current link is complete, and execution returns to Step 930 of FIG. 7. Following Step 1000, a determination is made as to whether or not the signal detect debounce function for the current link is enabled (Step 930). This determination is made by testing the state of the Signal Detect Debounce Function Enable field of the link list entry for the current link, as shown in FIG. 9 and determined via Step 1140 or Step 1150 of FIG. 8. If Step 930 is TRUE, the system enables the signal detect debounce function for the current link. The debounce timer threshold register 403 value for the current link is set to the value of the Optimized Debounce Timer Threshold field in the link list entry for the current link, as shown in FIG. 9 and determined in Step 1120 of FIG. 8, and bypass mode for the current link is set to FALSE (Step 940). As discussed above, setting the debounce timer threshold to a non-zero value results in bypass mode being FALSE. Following Step 940, a determination is made as to whether or not the rapid energy detect function for the current link is enabled (Step 950). When enabled, the rapid energy detect function checks for early resumption of signaling across the link by the remote transmitter between the time the receiver-side enters the "QUIET" state and the debounce time period associated with receiver-side "QUIET" state entry expires. Variables related to the rapid energy detect function are one detector enable, one detector timer and one detector timer threshold.

If Step 950 is TRUE, the rapid energy detect function for the current link is enabled. The one detector for the current link is enabled, and the one detector threshold is set to the Rapid Wake Threshold value of the link list entry for the current link, as shown in FIG. 9 (Step 970). It should be noted that this step corresponds to setting the one detector enable register 412 to logic "1" and setting the one detector threshold register 413 to the rapid wake threshold value. Otherwise if Step 950 is FALSE, the rapid energy detect function for the current link is disabled and the one detector for the current link is disabled (Step 960). This step corresponds to setting the one detector enable register 412 to logic "0". Otherwise if Step 930 is FALSE, the system disables the signal detect debounce function for the current link. The debounce timer threshold register 403 value for the current link is set to logic "0", the bypass mode for the current link is set to TRUE, and the one detector enable register 412 is set to logic "0" (Step 935). As discussed above, setting the debounce timer threshold register 403 value to zero results in bypass mode being TRUE. Following Step 935, Step 960 or Step 970, a determination is made as to whether or not the Current Link value is equal to the Last Link in the system link list, as shown in FIG. 9 (Step 980). If Step 980 is FALSE, the Current Link is set to the Link ID of the Next Link in the system link list (Step 990). Otherwise if Step 980 is TRUE, the link signal debounce function initialization procedure is complete, and the system returns to the next step in the perform link initialization procedure (Step 900 of FIG. 5).

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "on", "in direct contact", "abutting", "directly adjacent to", etc., are intended to indicate that at least one element physically contacts another element (without other elements separating the described elements). The corresponding structures, materials, acts, and equivalents of all means or steps plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a receiver receiving data signals intermittently transmitted by a transmitter over a channel,
the receiver comprising a signal detector that detects data signal transmissions on the channel and suspension of the data signal transmissions, and
the signal detector outputting a signal detect indicator and causing the signal detect indicator to be a first logic value during the data signal transmissions and a second logic value during the suspension of the data signal transmissions; and,
a signal controller receiving the signal detect indicator and outputting an energy detect indicator,
the signal controller further detecting transitions in the signal detect indicator and causing corresponding transitions in the energy detect indicator such that any transition of the energy detect indicator from the second logic value to the first logic value is delayed.

2. The structure of claim 1, the transition of the energy detect indicator from the second logic value to the first logic value being delayed until a predetermined time period has elapsed.

3. The structure of claim 2, the predetermined time period being adjustable.

4. The structure of claim 1, further comprising a physical control sublayer causing operation in a normal power mode when the energy detect indicator has the first logic value and remaining in a low power idle mode when the energy detect indicator has the second logic value.

5. The structure of claim 1, the first logic value being a "1" value and the second logic value being a "0" value.

6. The structure of claim 1, the receiver entering a non-active state upon detecting the suspension of the data signal transmissions by the transmitter and the receiver exiting the non-active state upon detecting resumption of the data signal transmissions by the transmitter.

7. The structure of claim 6, further comprising a system interrupt controller, the signal controller further outputting an interrupt control signal to the system interrupt controller,
when the receiver is in the non-active state, the signal controller holding the interrupt control signal at the first logic value, and
when the receiver has exited the non-active state, the signal controller permitting the interrupt control signal to transition in response to transitions detected in the signal detect indicator subject to a delay of a predetermined time period.

8. The structure of claim 1, the channel comprising a high-speed serial link.

9. A structure comprising:
a receiver receiving data signals intermittently transmitted by a transmitter over a channel,
the receiver comprising a signal detector that detects data signal transmissions on the channel and suspension of the data signal transmissions, and
the signal detector outputting a signal detect indicator and causing the signal detect indicator to be a first logic value during the data signal transmissions and a second logic value during the suspension of the data signal transmissions; and,
a signal controller receiving the signal detect indicator, evaluating signal detect indicator logic value stability, and outputting an energy detect indicator,
the signal controller further detecting transitions in the signal detect indicator and causing corresponding transitions in the energy detect indicator such that any transition of the energy detect indicator from the second logic value to the first logic value is delayed until either a predetermined time period has elapsed or a stable signal detect indicator first logic value is detected.

10. The structure of claim 9, the predetermined time period being adjustable.

11. The structure of claim 9, further comprising a physical control sublayer causing operation in a normal power mode when the energy detect indicator has the first logic value and remaining in a low power idle mode when the energy detect indicator has the second logic value.

12. The structure of claim 9, the receiver entering a non-active state upon detecting the suspension of the data signal transmissions by the transmitter and the receiver exiting the non-active state upon detecting resumption of the data signal transmissions by the transmitter.

13. The structure of claim 12, further comprising a system interrupt controller, the signal controller further outputting an interrupt control signal to the system interrupt controller,
when the receiver is in the non-active state, the signal controller holding the interrupt control signal at the first logic value, and
when the receiver has exited the non-active state, the signal controller permitting the interrupt control signal to transition in response to transitions detected in the signal detect indicator subject to a delay of the predetermined time period.

14. A method comprising:
receiving, by a receiver, data signals intermittently transmitted by a transmitter over a channel;
detecting, by the receiver, data signal transmissions on the channel and suspension of the data signal transmissions;
outputting, by the receiver, a signal detect indicator having a first logic value during the data signal transmissions and a second logic value during the suspension of the data signal transmissions;
receiving, by a signal controller operably connected to the receiver, the signal detect indicator;
detecting, by the signal controller, transitions in the signal detect indicator; and,
outputting, by the signal controller to a physical control sublayer, an energy detect signal with corresponding transitions such that any transition of the energy detect indicator from the second logic value to the first logic value is delayed.

15. The method of claim 14, the transition of the energy detect indicator from the second logic value to the first logic value being delayed until a predetermined time period has elapsed.

16. The method of claim 15, the predetermined time period being adjustable.

17. The method of claim 14, further comprising evaluating, by the signal controller, signal detect indicator logic value stability, the transition of the energy detect indicator from the second logic value to the first logic value being delayed until either a predetermined time period has elapsed or a stable signal detect indicator first logic value is detected.

18. The method of claim 14, further comprising causing, by the physical control sublayer, operation in a normal power mode when the energy detect indicator has the first logic value and remaining in a low power idle mode when the energy detect indicator has the second logic value.

19. The method of claim 14, further comprising entering a non-active state upon detecting the suspension of the data signal transmissions and exiting the non-active state upon detecting resumption of the data signal transmissions.

20. The method of claim 19, further comprising:
outputting, by the signal controller to a system interrupt controller, an interrupt control signal,
the interrupt control signal being held at the first logic value, when the receiver is in the non-active state,
the interrupt control signal being permitted to transition in response to transitions detected in the signal detect indicator subject to a delay of a predetermined time period, when the receiver has exited the non-active state.

* * * * *